(12) United States Patent
Ioku et al.

(10) Patent No.: US 7,739,672 B2
(45) Date of Patent: Jun. 15, 2010

(54) INFORMATION PROCESSOR, INFORMATION PROCESSING METHOD, AND PROGRAMS THEREFOR

(75) Inventors: Akira Ioku, Tokyo (JP); Tatsuo Isobe, Yokohama (JP); Yoshiaki Morimoto, Kawasaki (JP); Shinichiro Kawasaki, Kawasaki (JP)

(73) Assignee: Hitachi Software Engineering, Co., Ltd., Yokohama-shi (JP)

( * ) Notice: Subject to any disclaimer, the term of this patent is extended or adjusted under 35 U.S.C. 154(b) by 1226 days.

(21) Appl. No.: 11/244,077

(22) Filed: Oct. 6, 2005

(65) Prior Publication Data

US 2006/0101426 A1 May 11, 2006

(30) Foreign Application Priority Data

Oct. 26, 2004 (JP) ............................. 2004-311095

(51) Int. Cl.
*G06F 9/45* (2006.01)
(52) U.S. Cl. ........................................ 717/136; 717/153
(58) Field of Classification Search .................. 717/136, 717/139, 140, 148
See application file for complete search history.

(56) References Cited

U.S. PATENT DOCUMENTS

| 5,392,437 | A | 2/1995 | Matter et al. |
| 5,790,877 | A | 8/1998 | Nishiyama et al. |
| 7,458,070 | B2* | 11/2008 | Presler-Marshall et al. .. 717/151 |
| 2001/0011369 | A1* | 8/2001 | Satoyama et al. .............. 717/4 |
| 2004/0003204 | A1 | 1/2004 | Yamada et al. |
| 2004/0025067 | A1* | 2/2004 | Gary et al. ................... 713/300 |
| 2005/0050526 | A1* | 3/2005 | Dahne-Steuber et al. .... 717/136 |
| 2007/0256063 | A1* | 11/2007 | Souloglou et al. ........... 717/146 |
| 2009/0055811 | A1* | 2/2009 | Presler-Marshall et al. .. 717/151 |

FOREIGN PATENT DOCUMENTS

| EP | 1 037 145 | 9/2000 |
| JP | 10-240546 | 9/1998 |
| JP | 10-254712 | 9/1998 |
| JP | 2001-22582 | 1/2001 |
| JP | 2004-030222 | 1/2004 |
| WO | WO 2004/006078 | 1/2004 |

* cited by examiner

*Primary Examiner*—Anna Deng
(74) *Attorney, Agent, or Firm*—Antonelli, Terry, Stout & Kraus, LLP.

(57) ABSTRACT

Power consumption can be suppressed while maintaining an appropriate execution speed. The information processor has an interpreter for interpreting a source program or intermediate language program and a run-time translator for translating the program into a machine language program native to the computer. The information processor comprises a power-saving request monitor for monitoring whether or not there is a power-saving request from an input interface or a predetermined power-saving request in a given memory, and a power-saving translation controller. The power-saving request makes a request for suppression of the power consumed by the processor. The power-saving translation controller makes a decision as to whether the run-time translator executes run-time translation of the program according to whether there is the power-saving request. Based on the result of the decision, the translation controller instructs the run-time translator to execute the run-time translation.

13 Claims, 14 Drawing Sheets

FIG.9

| MEASUREMENT POINT NUMBER (172) | SYMBOL NAME (173) | NUMBER OF PASSES (171) | |
|---|---|---|---|
| 1 | METHOD A | 1 | 1710 |
| 2 | METHOD B | 0 | 1711 |
| | ⋮ | ⋮ | |

FIG.10

| ITEM NUMBER (182) | THRESHOLD NAME (183) | SET VALUE (181) | |
|---|---|---|---|
| 1 | LOWER LIMIT OF NUMBER AT WHICH TRANSLATION IS STARTED | 100 | 1810 |

FIG.11

| ITEM NUMBER (192) | THRESHOLD NAME (193) | SET VALUE (191) | |
|---|---|---|---|
| 1 | LOWER LIMIT OF NUMBER AT WHICH TRANSLATION IS STARTED (ON REQUEST FOR POWER-SAVING) | 10000 | 1910 |

INFORMATION PROCESSOR, INFORMATION PROCESSING METHOD, AND PROGRAMS THEREFOR

INCORPORATION BY REFERENCE

The present application claims priority from Japanese application JP2004-311095 filed on Oct. 26, 2004 the content of which is hereby incorporated by reference into this application.

FIELD OF THE INVENTION

The present invention relates to a method of translating a source program into a machine language program in a computer and, more particularly, to an information processing method which uses an intermediate format common to plural kinds of computers, compiles the intermediate language (or, bytecodes) during run time, transforms it into a machine language, and executes the language. Especially, the invention relates to the information processing method implemented on an information processor having a bytecode accelerator that converts a stack-based intermediate language (bytecodes) into register-based instructions by hardware.

BACKGROUND OF THE INVENTION

Methods for executing programs described in high-level languages on computers are generally roughly classified into two major categories: the compiler method and the interpreter method which will be described below. Furthermore, run-time translation that is a method adopting the advantages of both compiler and interpreter methods is known. As an example, in environments in which Java (trademark registered) can be executed, run-time translation technology, known as JIT (just-in-time) compiler, is widely accepted and put into practical use. The following techniques have been proposed as known techniques regarding run-time translation.

For example, an installer having a CPU and a memory and executing an abstract object program by means of the CPU has been proposed (see JP-A-10-254712). The installer has means for receiving the abstract object program in an intermediate language format not dependent on computer's type, means for generating a machine language program on the memory from the received abstract object program, and means for causing the CPU to execute the generated machine language program immediately after the generation.

In addition, an information processor having plural registers, an instruction execution portion for executing a first format instruction as native instructions, and an instruction converting circuit has been proposed (see JP-A-2004-30222 (corresponding to US2004/3204A1)). When the first program written in a second format is executed, the information processor can be operated either in a first mode or in a second mode. In the first mode of operation, a first instruction set contained in the first program is converted into the first format instructions by the instruction converting circuit and executed. In the second mode of operation, a second instruction set contained in the first program is converted into the first format instructions by conversion software written in the first format instructions and executed. When the mode of operation is switched between the first and second modes, a transient mode of operation is introduced. Transfer of data between at least one of the registers and the instruction converting circuit is performed in parallel with the operation for switching of mode of operation.

Furthermore, a run-time program translation method for interpreting a source program or intermediate language program common to plural computers and translating the program into a machine language program native to each computer has been proposed (see JP-A-10-240546 (corresponding to US2001/11369A1)). Interpreting means for interpreting the source program or intermediate language program and program translating means for translating each individual module of the source program or intermediate language program into a machine language program are provided. The interpreting means counts the number of executions of each module during interpretation of the source program or intermediate language program and creates data about the frequency of the execution. The program translating means selects the module executed most frequently from the data about the frequencies of executions concurrently with the interpretation of the source program or intermediate language program done by the interpreting means. The module is translated into a machine language program.

The well-known, general run-time translation technique is first described below while citing the description of the "prior art" of Patent Reference 1 after describing the compiler method and the interpreter method which are key techniques, because the concept shown in the "prior art." of Patent Reference 1 is hardly varied today.

In the compiler method, a program described in a high-level language is converted into a machine language program for the computer to be run. Then, the converted machine language program is directly executed. On the other hand, in the interpreter method, a language (intermediate language) different from the machine language for the computer to be run is set. Another program (interpreter) for interpreting the intermediate language on the computer to be run is previously prepared. The program written in a high-level language is converted into an intermediate language program, which in turn is executed by the interpreter.

The advantage of the compiler method over the interpreter method lies in the high speed of execution of programs for the following reasons.

(Advantage 1 of the Compiler Method)

The interpreter method needs assignment to processing steps corresponding to individual intermediate codes and computation of addresses of operands, in addition to execution of machine language corresponding to an intermediate language. Meanwhile, the compiler method does not need them because machine language is directly executed.

(Advantage 2 of the Compiler Method)

In the compiler method, omission (optimization) of processing taking account of the context of the program and the characteristics of the executing computer is possible.

On the other hand, in the interpreter method, the interpreter itself has versatility regarding intermediate language programs. Therefore, the interpreter simply executes the intermediate language program intact. Omission of processing taking account of the context of the program cannot be done. Furthermore, the characteristics of the executing computer are not reflected in the intermediate language program. Therefore, it is impossible to increase the speed of processing, for example, by mapping certain variables described in a high-level language into a register in the target computer.

The compiler method, however, has disadvantages compared with the interpreter method.

(Disadvantage 1 of the Compiler Method)

Each type of machine needs a compiler for converting a source program into a machine language program. The amount of compiler developed is increased. Besides, it is necessary to perform maintenance and expansion according to each individual machine type. This increases the overheads associated with maintenance and expansion.

(Disadvantage 2 of the Compiler Method)

Where the same program is executed on plural machine types, each individual machine type needs a separate compilation for conversion from a source program into a machine language program. This produces a large amount of overhead in management of machine language program.

(Disadvantage 3 of the Compiler Method)

In an environment where plural machine types are connected by a network, plural machine language programs corresponding to the same program are necessary for the plural machine types. This presents problems in managing versions and controlling the disk space. In addition, it is difficult to execute the same program distributively.

(Disadvantage 4 of the Compiler Method)

In some systems actually in operation, only a machine language program is used for operation; there is no source program. In such a system, it is difficult to switch or modify the machine type constituting the system. Furthermore, as the hardware technology is improved, computer architectures can be brought to a higher level with greater ease. However, in order to inherit the resources of machine language programs, strong limitations are imposed on changing of architecture.

Accordingly, where emphasis is placed on decrease of run time, the compiler method is more advantageous but results in demerits in terms of maintenance and operations as described above. Consequently, it has been necessary to use both the compiler and interpreter methods properly.

As a measure for mitigating the tradeoff between the aspect of maintenance and operation and the aspect of speed, a system making use of the advantages of both compiler and interpreter methods has been developed. This is the run-time translation (hereinafter referred to as "Method 1").

Method 1 adopts an intermediate language program not dependent on certain computer machines as the aspect of maintenance and operation. When the intermediate language program is executed, it is converted into a machine language program for the target computer to obtain higher speed. In an environment where a Java (trademark registered) program can be executed and there is a run-time JIT (just-in-time) compiler, if the run-time compiler (run-time translator) performs dynamic compilation, the result of the run-time compilation (run-time translation) is stored in memory, and the intermediate language is subsequently executed, then the compiled native codes (machine codes) are executed.

Furthermore, a method of solving the disadvantage of the interpreter method in terms of speed by increasing the speed of the interpreter method (execution of intermediate language translation) itself has been developed. Especially, it is known that addition of hardware-based speed increase-assisting mechanism produces great speed-increasing effects. One example uses a bytecode accelerator (hardware accelerator) for converting a stack-based intermediate language (bytecodes) into register-based instructions as described in the "prior art" of Patent Reference 2. The speed is increased by executing the intermediate language directly by the hardware while the interpreter method is retained (hereinafter referred to as "Method 2").

In Method 1 described above, speed increases are achieved by software (run-time translation). On the other hand, it can be said that Method 2 achieves speed increases by hardware. These two methods, which mitigate the tradeoff between the compiler and interpreter methods in terms of the aspect of maintenance and operation and the aspect of speed, are common in that they can greatly improve the execution speed compared with the prior art software-based interpreter method. There is nothing to choose between these two methods.

The advantages and disadvantages of Method 1 (improved speed owing to software (run-time translation)) are as follows. It is known that where run-time translation is used, there arise the disadvantages that the load on the CPU is increased by compilation at run-time (generally known as run-time compilation) and that the size of the memory necessary to store the generated machine language program is increased. It is also known that the tendency that such CPU load and the amount of used memory are increased hinders application of a run-time program translation.

This disadvantage is mitigated by using profiled, run-time translation (i.e., evaluating (profiling) the frequency of execution and compiling only those portions which are executed at high frequency at run-time) as in the technique described in Patent Reference 3. However, not all of the disadvantages are removed.

Meanwhile, in this method, limitations due to the type of intermediate language, or the drawback with Method 2 (described later), do not occur. This constitutes an advantage.

The advantages and disadvantages of Method 2 (increased speed by hardware (bytecode accelerator)) are as follows. As mentioned in the "problem to be solved by the invention" of Patent Reference 2, in a case where hardware for converting an intermediate language into the native language (hereinafter referred to as CPU instructions or machine language) of the microcomputer that is a target during execution is used, only some intermediate languages are supported because it is difficult to execute every intermediate language by hardware. Although it is ideal to be able to convert every intermediate language by hardware, only some intermediate languages are supported, for the following reason. Some intermediate languages have complex functions. If such languages are converted, one intermediate code corresponds to tens to hundreds of CPU instructions. Therefore, if all the intermediate languages should be processed by hardware, the size of the hardware is increased excessively.

Accordingly, there are usually some kinds of processing which cannot be processed at increased speed by hardware. Those kinds of processing are treated by the prior art interpreter. Therefore, the speed-increasing effect is achieved only partially. This constitutes a disadvantage.

Meanwhile, unlike run-time translation using a compiler, the amount of processing is not increased during compilation. Also, any additional area for storing the result of compilation is not necessary. These constitute advantages.

In view of the foregoing, it can be considered that the execution speed can be improved more easily by making the run-time translation and bytecode accelerator complement each other.

For example, a method in which a subject of run-time translation is selected according to the execution frequency is now discussed. The subject (bytecodes) treated by the interpreter is passed through the bytecode accelerator and so those portions which are not subjected to run-time translation are also increased in speed. Therefore, it can be said that run-time translation coexisting with the bytecode accelerator is more adapted for increased speed than run-time translation used with no bytecode accelerator.

Where run-time translation coexisting with a bytecode accelerator is compared with a configuration in which only a bytecode accelerator exists and there is no run-time compiler, intermediate codes not supported by the bytecode accelerator are contained in the intermediate codes dynamically compiled by the compiler. This is advantageous for increase of speed.

During discussion of the combination of a software-based speed-increasing configuration (run-time translation) and a hardware-based speed-increasing mechanism (bytecode accelerator) as described above, we have realized that this combination creates a tradeoff between the power consumption and execution speed.

However, in the prior discussion of run-time translation, overhead due to the load imposed by the compilation itself delays local processing as occurring at startup. Also, it has been considered that there is a problem from a viewpoint of memory consumption. However, the overhead has not been regarded as problematic from a viewpoint of power consumption, for the following reason.

Where run-time translation is used, the execution speed is much higher (several times to ten times or higher) than where run-time translation is not used. The CPU load for the same amount of task is reduced, i.e., the number of dynamic steps is reduced. As a result, a power-saving effect is rather produced.

However, if an execution environment where a bytecode accelerator can be utilized effectively in interpreting an intermediate language is available, the overwhelming priority of the execution speed of run-time translation disappears. Therefore, increase in the power consumption due to overhead of the run-time translation tends to become conspicuous. Compared with the case where execution is performed using only a bytecode accelerator, combined use of run-time translation and a bytecode accelerator may incur a disadvantage in terms of power consumption (i.e., increase in power consumption), though this combined use is advantageous in terms of execution speed.

Accordingly, in view of the foregoing problems, the present invention has been made. It is a main object of the present invention to provide information processor and information processing method which can vary the allocation ratio between run-time translation and interpretation of intermediate language and suppress the power consumption while maintaining an appropriate execution speed.

SUMMARY OF THE INVENTION

An information processor that solves the foregoing problems in accordance with the teachings of the present invention has interpretation means for interpreting a source program or intermediate language program and run-time translation means for translating the program into a machine language program native to a computer. The information processor is characterized in that it further includes a power-saving request monitor and a power-saving translation controller. The power-saving request monitor monitors whether or not there is a power-saving request from an input interface or a predetermined power-saving request in a given memory device. The power-saving request makes a request for suppression of power consumed by the information processor. The power-saving translation controller makes a decision as to whether the run-time translation means executes a run-time translation of the program according to whether there is the power-saving request, and instructs the run-time translation means to execute the run-time translation according to the result of the decision. (First aspect of the invention).

A second aspect of the present invention is based on the first aspect and further characterized in that if the result of the decision is that there is the power-saving request, the power-saving translation controller disables execution of run-time translation of the program and if the result of the decision is that there is not the power-saving request, the power-saving translation controller enables the execution of the run-time translation of the program.

A third aspect of the present invention is based on the first aspect and further characterized in that the power-saving translation controller makes a decision as to whether the run-time translation means executes the run-time translation of the program according to magnitude of the power-saving request, and instructs the run-time translation means to execute processing of run-time translation based on the result of the decision.

A fourth aspect of the present invention is based on the third aspect and further characterized in that when making the decision, the power-saving translation controller disables execution of the run-time translation of the program in a case where the power-saving request makes a request for power saving stronger than a given decision criterion and enables execution of the run-time translation of the program in a case where the power-saving request makes a request for power saving weaker than the given decision criterion.

A fifth aspect of the present invention is based on the first aspect and further characterized in that the power-saving translation controller varies a decision criterion for whether the run-time translation is executed or not, depending on whether there is the power-saving request and on circumstances of power consumed by the information processor.

A sixth aspect of the present invention is based on the fifth aspect and further characterized in that the decision criterion is a given execution frequency determined regarding the execution frequency of the program. When the decision criterion is varied and there is the power-saving request or the circumstances of the power consumed require power saving, the power-saving translation controller sets the predetermined execution frequency that is the decision criterion to a frequency higher than in a case where there is not the power-saving request or the circumstances of power consumed do not require power saving.

A seventh aspect of the present invention is an information processor having interpretation means for interpreting a source program or intermediate language program, a hardware accelerator interlocking with the interpretation means and converting an instruction expression contained in the program into instructions native to the CPU of the information processor, and run-time translation means for translating the program into a machine language program native to a computer. The information processor is characterized in that it further includes a power-saving request monitor and a power-saving translation controller. The power-saving request monitor monitors whether or not there is a power-saving request from an input interface or a predetermined power-saving request in a given memory device. The power-saving request makes a request for suppression of power consumed by the information processor. The power-saving translation controller makes a decision as to whether the run-time translation means executes run-time translation of the program or as to whether processing of the interpreter involving the hardware accelerator is executed or not according to whether there is the power-saving request, and instructs the run-time translation means to execute the run-time translation or instructs the hardware accelerator to execute the processing of the interpreter according to the result of the decision.

An eighth aspect of the present invention is based on the seventh aspect and further characterized in that when the power-saving translation controller makes a decision as to whether the run-time translation means executes the run-time translation of the program, the power-saving translation controller disables execution of the run-time translation of the program or execution of the processing of the interpreter in a case where there is the power-saving request and enables run-time translation of the program or execution of the processing of the interpreter in a case where there is not the power-saving request.

A ninth aspect of the present invention is based on the seventh aspect and further characterized in that the power-saving translation controller makes a decision as to whether the run-time translation means executes run-time translation of the program or as to whether the processing of the interpreter involving the hardware accelerator is executed according to magnitude of the power-saving request and instructs the run-time translation means to execute the run-time translation or instructs the hardware accelerator to execute the processing of the interpreter based on the result of the decision.

A tenth aspect of the present invention is based on the ninth aspect and further characterized in that when the decision is made, in a case where the power-saving request makes a request for power saving stronger than a given decision criterion, the power-saving translation controller disables execution of the run-time translation of the program or processing of the interpreter and, in a case where the power-saving request makes a request for power saving weaker than the given decision criterion, the power-saving translation controller enables execution of the run-time translation of the program or processing of the interpreter.

An eleventh aspect of the present invention is based on the seventh aspect and further characterized in that the power-saving translation controller modifies a decision criterion for whether the run-time translation or processing of the interpreter is executed or not, depending on whether there is the power-saving request or on circumstances of power consumed by the information processor.

A twelfth aspect of the present invention is based on the eleventh aspect and further characterized in that the decision criterion is a given execution frequency determined regarding the execution frequency of the program. When the decision criterion is modified and there is the power-saving request or the circumstances of the power consumed require power saving, the power-saving translation controller sets the given execution frequency that is the decision criterion to a frequency higher than in a case where there is not the power-saving request or the circumstances of power consumed do not require power saving.

A thirteenth aspect of the present invention is an information processing method implemented by an information processor having interpretation means for interpreting a source program or intermediate language program and run-time translation means for translating the program into a machine language program native to a computer. The method comprises the steps of: monitoring whether or not there is a power-saving request from an input interface or a predetermined power-saving request in a given memory device, the power saving request making a request for suppression of power consumed by the information processor; making a decision as to whether the run-time translation means executes run-time translation of the program according to whether there is the power-saving request; and instructing the run-time translation means to execute processing of run-time translation based on the result of the decision.

A fourteenth aspect of the present invention is an information processing method implemented by an information processor having interpretation means for interpreting a source program or intermediate language program, a hardware accelerator interlocking with the interpretation means and converting an instruction expression contained in the program into instructions native to a CPU of the information processor, and run-time translation means for translating the program into a machine language program native to a computer. The method comprises the steps of: monitoring whether or not there is a power-saving request from an input interface or a predetermined power-saving request in a given memory device, the power-saving request making a request for suppression of power consumed by the information processor; making a decision as to whether the run-time translation means executes run-time translation of the program or processing of an interpreter involving the hardware accelerator is executed according to whether there is the power-saving request; and instructing the run-time translation means to execute processing of run-time translation or instructing the hardware accelerator to execute the processing of the interpreter based on the result of the decision.

A fifteenth aspect of the present invention is a program for implementing an information processing method by an information processor having interpretation means for interpreting a source program or intermediate language program and run-time translation means for translating the program into a machine language program native to a computer. The method comprises the steps of: monitoring whether or not there is a power-saving request from an input interface or a predetermined power-saving request in a given memory device, the power-saving request making a request for suppression of power consumed by the information processor; and making a decision as to whether the run-time translation means executes run-time translation of the program according to whether there is the power-saving request and instructing the run-time translation means to execute processing of run-time translation based on the result of the decision.

A sixteenth aspect of the present invention is a program for implementing an information processing method by an information processor having interpretation means for interpreting a source program or intermediate language program, a hardware accelerator interlocking with the interpretation means and converting an instruction expression contained in the program into instructions native to a CPU of the information processor, and run-time translation means for translating the program into a machine language program native to a computer. The method comprises the steps of: monitoring whether or not there is a power-saving request from an input interface or a predetermined power-saving request in a given memory device, the power-saving request making a request for suppression of power consumed by the information processor; making a decision as to whether the run-time translation means executes processing of run-time translation of the program or processing of an interpreter involving the hardware accelerator is executed according to whether there is the power-saving request; and instructing the run-time translation means to execute processing of run-time translation or instructing the hardware accelerator to execute processing of the interpreter based on the result of the decision.

Other problems disclosed by the present application and methods of solving them will become apparent from the description of the preferred embodiments of the invention and from the drawings.

According to the present invention, the allotment ratio between run-time translation and interpretation of an intermediate language is made variable. Power consumption can be suppressed while maintaining an appropriate execution speed.

Other objects, features and advantages of the invention will become apparent from the following description of the embodiments of the invention taken in conjunction with the accompanying drawings.

BRIEF DESCRIPTION OF THE DRAWINGS

FIG. 9 shows a measurement recording table in an embodiment of the invention;

FIG. 10 shows a translation condition setting table in an embodiment of the invention;

FIG. 11 shows a power-saving translation condition setting table in an embodiment of the invention;

DESCRIPTION OF THE EMBODIMENTS

Embodiment 1

Figure 1:
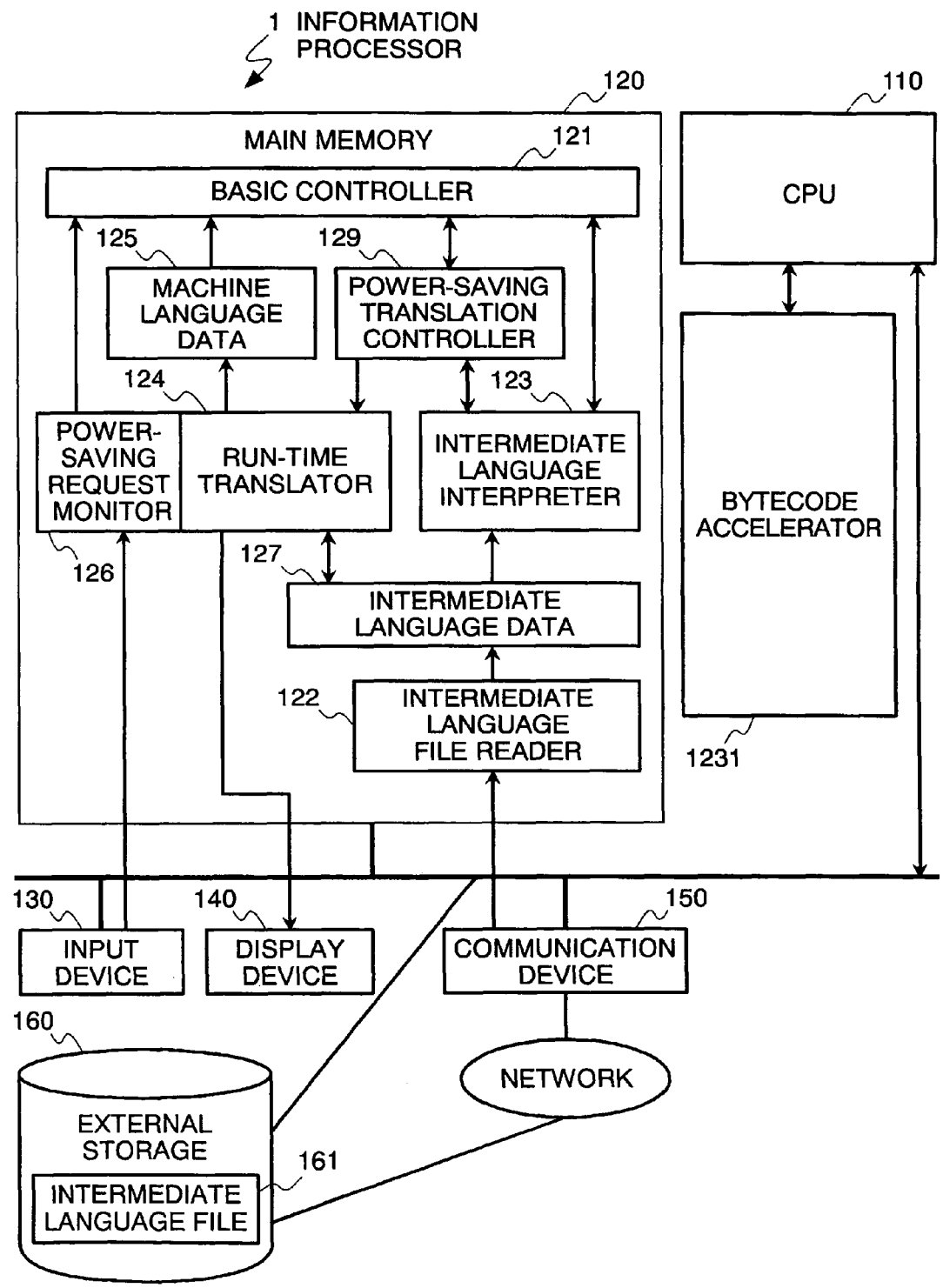
FIG. 1 is a diagram illustrating the configuration of an information processor according to one embodiment of the present invention (Embodiment 1)

The configuration of an information processor associated with an embodiment of the present invention is described with reference to the drawings. It is to be noted that the invention is not limited thereto. FIG. 1 is a block diagram schematically showing the configuration of the information processor that implements a method of translating a program at run-time in accordance with one embodiment of the present invention.

In FIG. 1, the information processor 1 includes a central processing unit (CPU) 110, a main memory 120, a basic controller 121, an intermediate language file reader 122, an intermediate language data interpreter 123 (acting as interpretation means), a run-time translator 124 (acting as run-time translation means), a power-saving request monitor 126, a power-saving translation controller 129, an input device 130, a display device 140, a communication device 150, and a bytecode accelerator 1231. Data treated by the information processor 1 include machine language data 125, intermediate language data 127, and an intermediate language file 161 stored in an external storage 160.

The bytecode accelerator 1231 converts a stack-based intermediate language (bytecodes) into register-based instructions, and is used to achieve increased speed by directly executing the intermediate language by hardware while retaining the interpreter method.

The main memory 120 described above is loaded with the basic controller 121, intermediate language file reader 122, intermediate language interpreter 123, and run-time translator 124. The intermediate language data 127 created by the intermediate language file reader 122 and machine language data 125 created by the run-time translator 124 are stored in the main memory 120. The intermediate language file 161 is stored in the external storage 160.

The basic controller 121 is a program for controlling the whole information processor that implements the information processing method according to the present invention. When the illustrated processor is activated, the programs are executed by the CPU 110 to provide fundamental control of the hardware of the information processor 1 and programs. When generation of events associated with the hardware units and programs in the information processor 1 is detected, if shortage of the remaining capacity of the battery is detected, the power-saving request monitor 126 can be informed of this detection.

The intermediate language file reader 122 is a program for reading the intermediate language file 161 from the external storage 160 and creating intermediate language data 127. The external storage 160 may be present via the communication device 150 and a network or exist locally.

As an example, the intermediate language interpreter 123 is an interpreter that interprets the intermediate language data 127. The interpreter 123 interprets and directly executes the intermediate language data 127.

The run-time translator 124 is the executing portion for program translation. The translator 124 selects a module from the intermediate language data 127 and converts the module into machine language data 125. The machine language data 125 is a program expressed by machine language statements that can be directly executed by the CPU 110. The intermediate language data 127 is data created by reading the intermediate language file 161 into the main memory 120. The intermediate language data 127 is interpreted and executed on an instruction by instruction basis by the intermediate language interpreter 123.

An intermediate language program written by virtual instructions (intermediate language instructions) not dependent on a certain computer system is held in the intermediate language file 161. Where this intermediate language program is obtained by converting some source program, information capable of relating the individual portions of the intermediate language program to the respective portions of the unconverted source program is stored in the file.

The power-saving request monitor 126 monitors and detects one or more events which need low power consumption operation. For example, the power-saving request monitor 126 recognizes the degree (magnitude) of the power saving request depending on the remaining capacity of the battery in the information processor 1 and on the content of user's request made when the software is activated or when it is being executed. The user's request is gained via the basic controller. Where the request monitor 126 has detected a circumstance where the degree of the power-saving request is high and thus power saving is necessary (shifting to power-saving mode is necessary), the monitor 126 turns ON a power-saving flag (not shown in FIG. 1), for example, within a given storage area in the main memory 120. Furthermore, the power-saving request monitor 126 detects an inverse event in which the mode of operation returns to normal operation (non-power-saving mode) from power-saving mode and turns OFF the power-saving flag.

The intermediate language file reader 122, intermediate language interpreter 123, and run-time translator 124 are read from the external storage 160 into the main memory 120 by the basic controller 121 and executed by the CPU 110.

Figure 2:
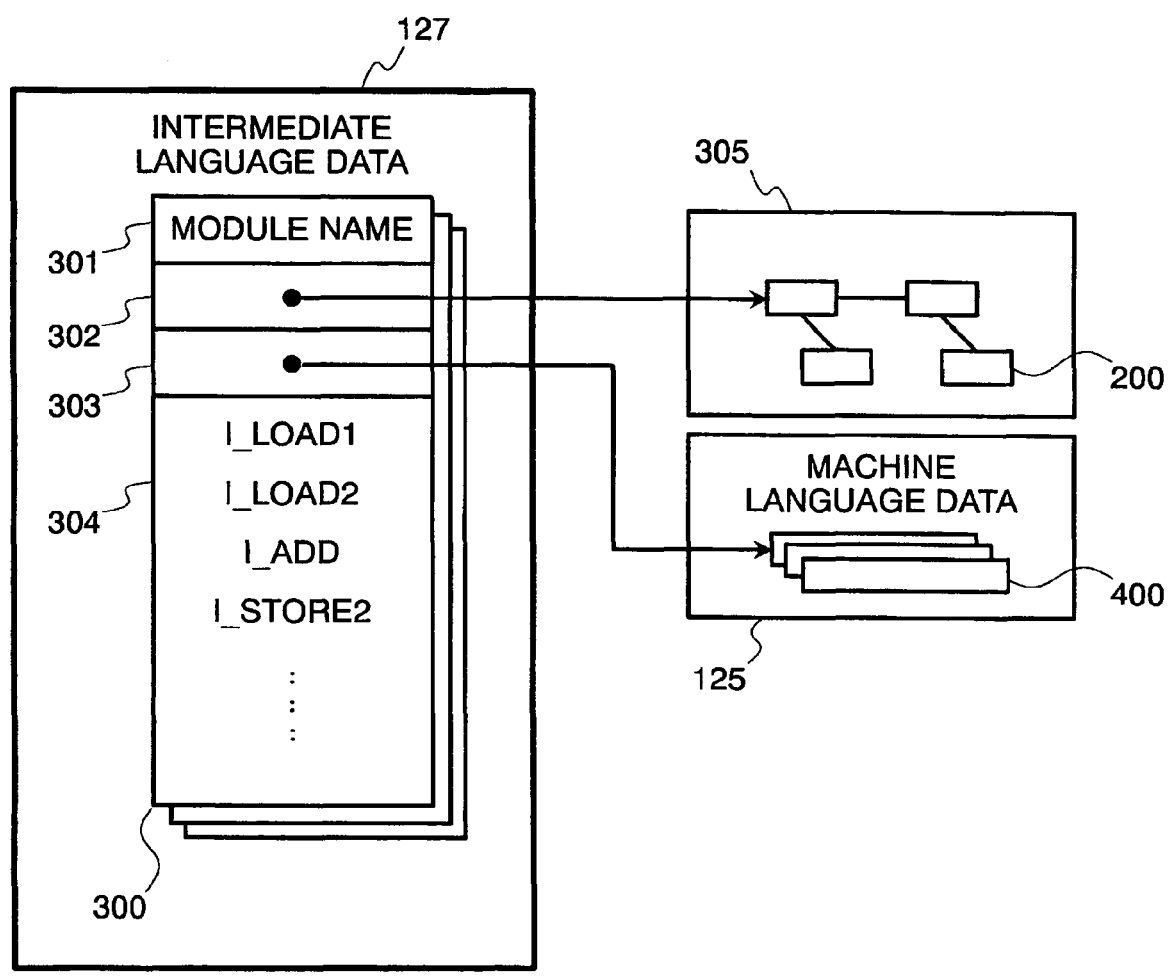
FIG. 2 is a diagram showing one example of intermediate language data.

FIG. 2 shows one example of the intermediate language data 127. In FIG. 2, the intermediate language data 127 contains intermediate language modules 300, each of which is composed of a module name 301 indicative of the module 300, a pointer 302 to management data 305 corresponding to the intermediate language module 300, a pointer 303 to the machine language data 125 obtained by translating the intermediate language module 300, and an intermediate language data area 304 for storing instruction sets of the intermediate language program in the intermediate language module 300. The intermediate language data 127 is composed of the plural intermediate language modules 300.

Figure 3:
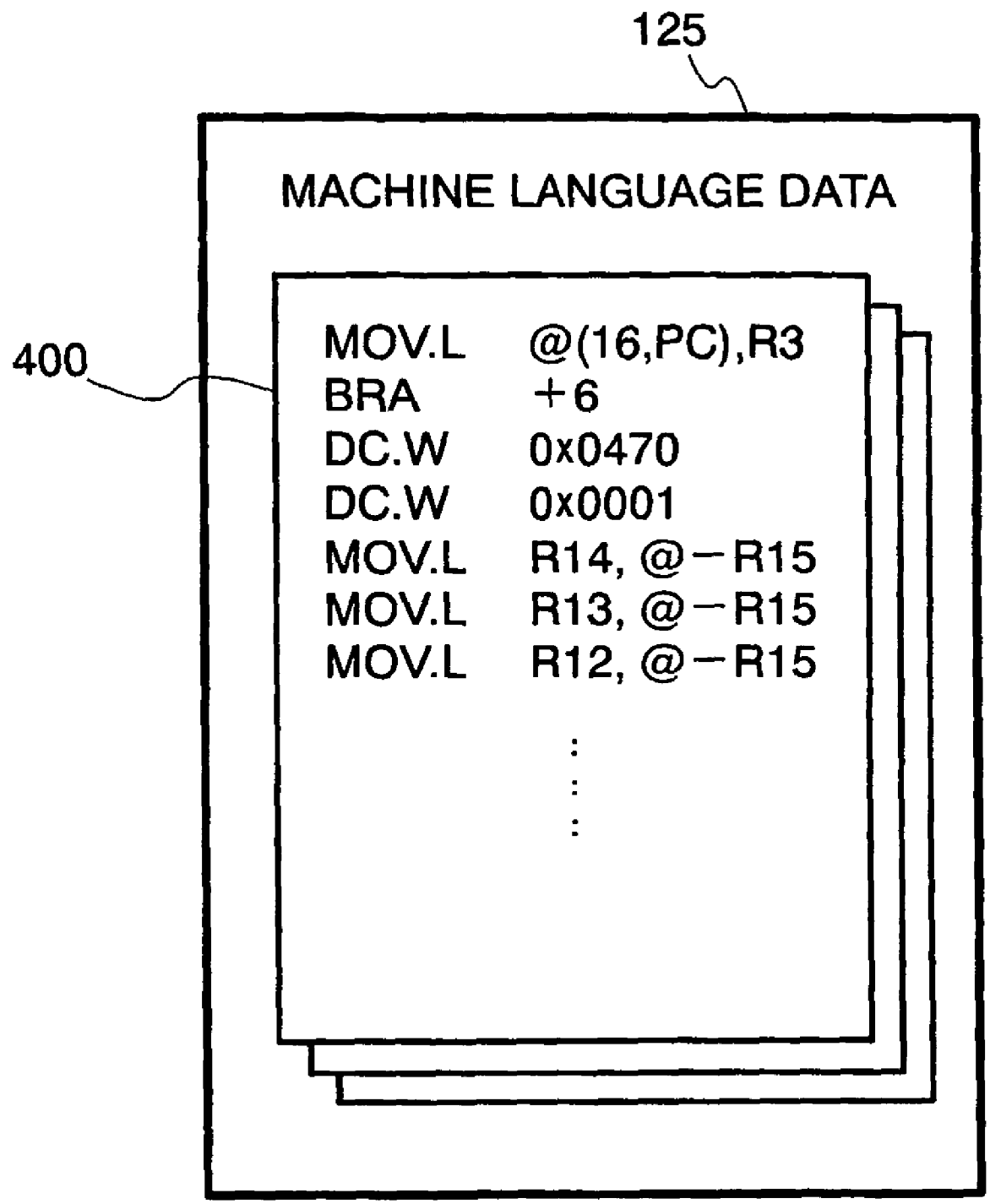
FIG. 3 is a diagram showing one example of machine language data.

FIG. 3 shows one example of the machine language data 125. In FIG. 3, machine language modules 400 are contained in the machine language data 125. Each machine language module 400 is composed of a data area in which plural machine language instructions are stored. The machine language data 125 is made up of such plural machine language modules 400.

The operation of the information processor according to one embodiment of the present invention is described below, the operation being implemented by the configuration described so far in connection with FIGS. 1 to 3.

Figure 4:
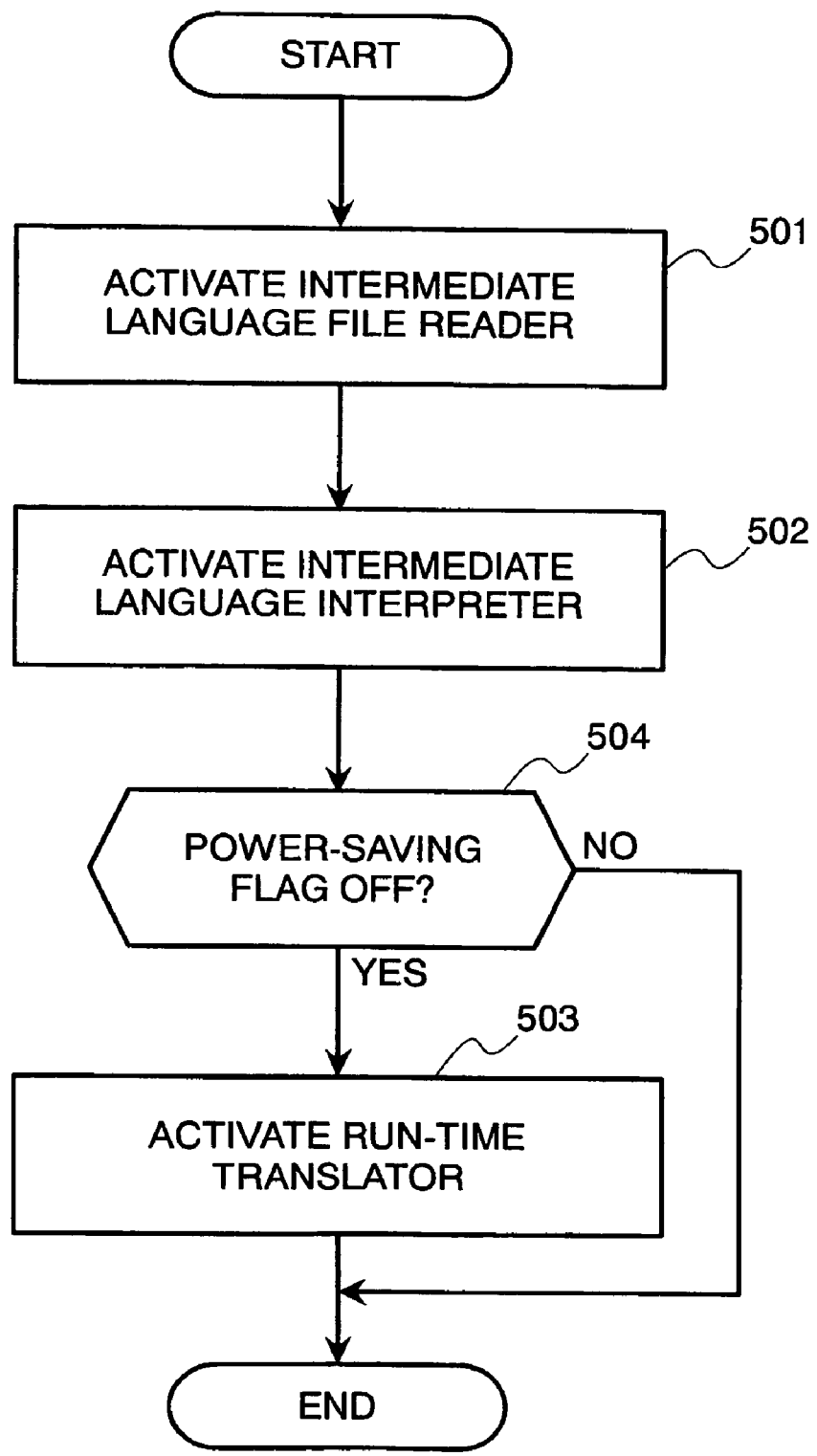
FIG. 4 is a flowchart illustrating processing performed by a basic controller.

FIG. 4 is a flowchart illustrating a processing procedure performed when the basic controller 121 starts up when a translation method according to one embodiment of the present invention is implemented.

In the processing shown in the flowchart of FIG. 4, the intermediate language interpreter 123 and run-time translator 124 are activated after the basic controller 121 reads in the intermediate language file 161. At this time, the intermediate language interpreter 123 and run-time translator 124 may be executed concurrently or serially.

(1) First, the basic controller 121 activates the intermediate language file reader 122 and waits until the processing of the file reader 122 is completed (step 501).

(2) After completion of the processing of the intermediate language file reader 122, the basic controller 121 activates the intermediate language interpreter 123 (step 502).

(3) Then, the basic controller 121 activates the run-time translator 124 (step 503).

(3') Where the power-saving flag (not shown in FIG. 1) is ON (i.e., generation of a power-saving request (shifting to the power-saving mode) has been detected), the basic controller 121 does not activate the run-time translator 124 (steps 504 and 505). This branch decision may be directly made by the basic controller 121 as illustrated in the flowchart. Alternatively, the decision may be made via the power-saving translation controller 129 in a manner not illustrated in the flowchart. These are characteristic process steps of the present invention.

Figure 5:
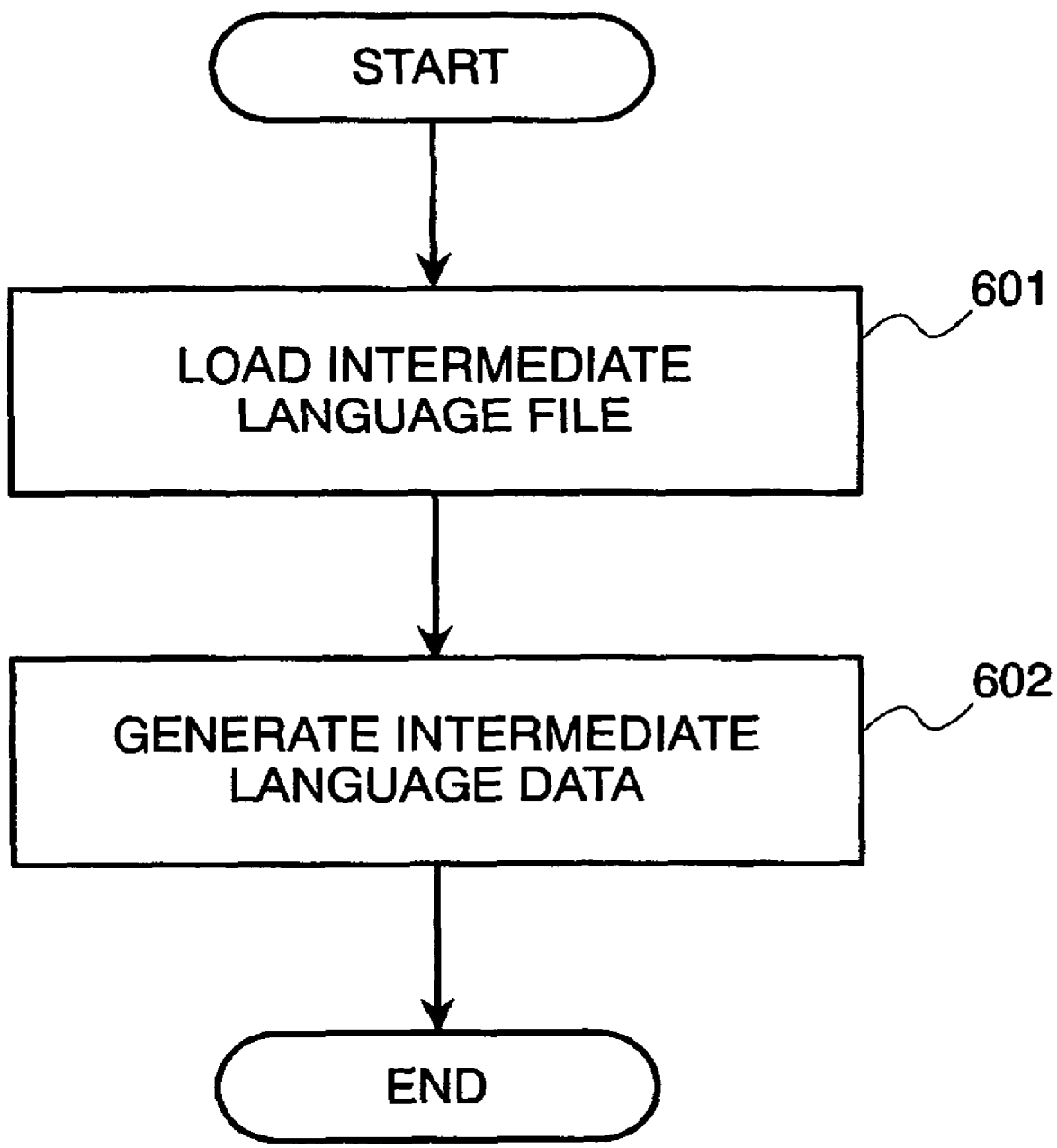
FIG. 5 is a flowchart illustrating processing performed by an intermediate language file reader.

FIG. 5 is a flowchart illustrating the processing procedure of the intermediate language file reader 122. In the flowchart of FIG. 5, the intermediate language file reader 122 reads in the intermediate language file 161 and creates the intermediate language data 127.

(1) When the intermediate language file reader 122 is activated by means of the basic controller 121 by the processing of the step 501 already described in connection with FIG. 4, the file reader reads in the intermediate language file 161 from the external storage 160 via the communication device 150 and network (step 601).

(2) Then, the intermediate language file reader 122 creates intermediate language data 127, which is composed of plural intermediate language modules 300 as previously described in connection with FIG. 2. The file reader 122 stores the module name of each module read in as an item of the module name 301, and initializes both pointer 302 to management data and pointer 303 to machine language data 125 to "0". The file reader also writes the intermediate language program stored in the read intermediate language file into the intermediate language data area 304 (step 602).

Figure 6:
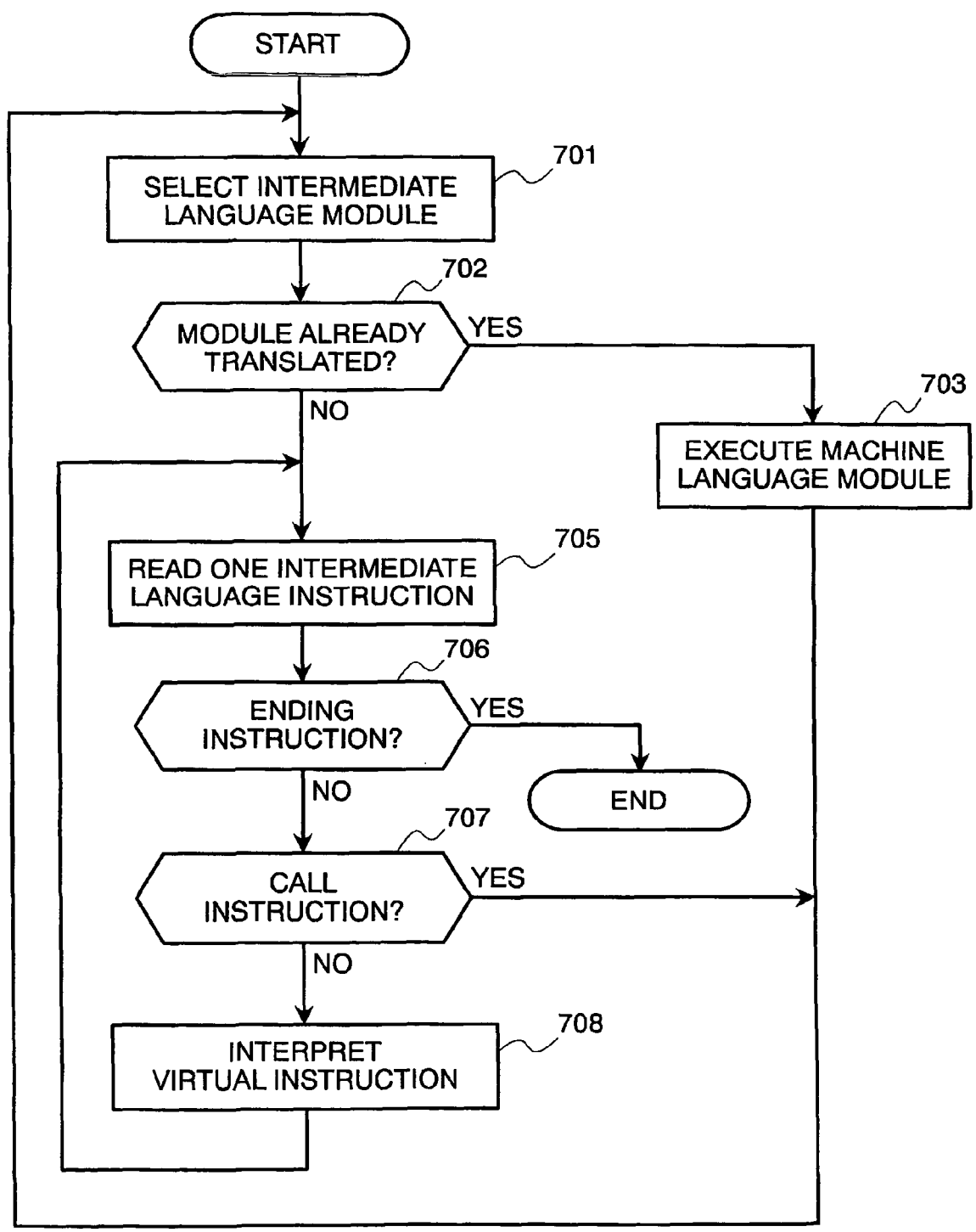
FIG. 6 is a flowchart illustrating processing performed by an intermediate language interpreter.

FIG. 6 is a flowchart illustrating the processing procedure of the intermediate language interpreter 123. The flowchart illustrated in FIG. 6 depicts processing of the intermediate language interpreter 123 to repeat interpretation of the intermediate language data 127.

(1) When the intermediate language interpreter 123 is activated by means of the basic controller 121 by the processing of the step 502 already described in connection with FIG. 4, the interpreter 123 selects one intermediate language module 300 from the intermediate language data 127. In the initial condition, an intermediate module having a module name 301 of "MAIN" is selected (step 701).

(2) The intermediate language interpreter 123 then makes a decision as to whether the intermediate language module 300 selected in the step 701 has been translated into a machine language program. If so, the basic controller 121 is made to execute the machine language program stored in the machine language module 400 indicated by the pointer 303 to the machine language data 125 contained in the intermediate language module 300 selected in the step 701. After the end of the execution, control returns to the processing of the step 701 (steps 702 and 703).

(3) On the other hand, if the decision made at the step 702 is negative (i.e., the intermediate language module 300 has not been translated into a machine language program), the intermediate language interpreter 123 reads in one instruction of the intermediate language data area 304 contained in the intermediate language module 300 selected at the step 701. The interpreter makes a decision as to whether the instruction is an ending instruction. If so, the processing is ended (steps 705 and 706).

(4) If the instruction read in as a result of the decision of the step 706 is not an ending instruction, the intermediate language interpreter 123 makes a decision as to whether the instruction read in at the step 705 is a call instruction or not. If the instruction is a call instruction, the processing is ended. If not so, the instruction read in at the step 705 is directly executed and then control returns to the processing of the step 705. Processing of the next instruction is continued (steps 707 and 708).

Figure 7:
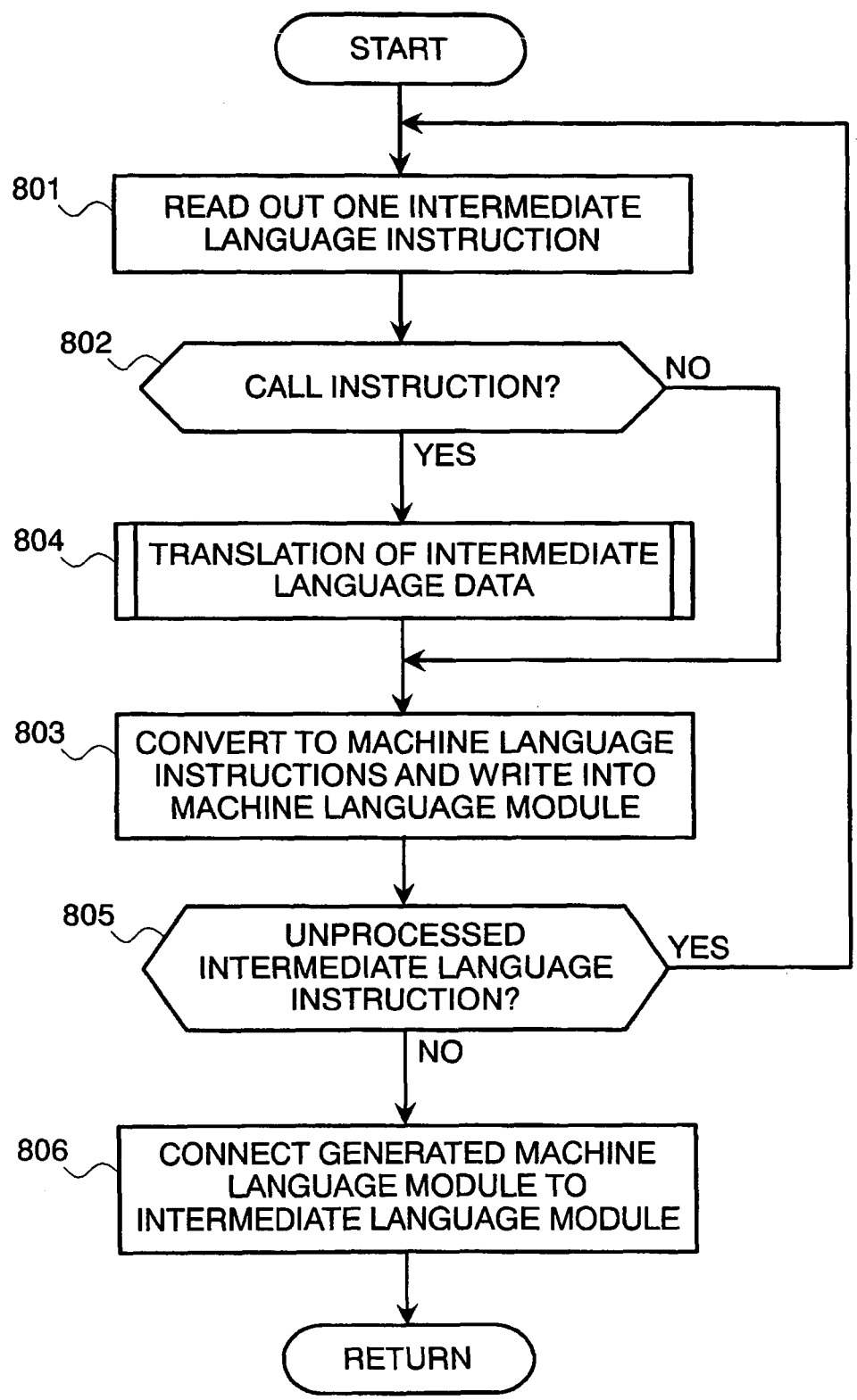
FIG. 7 is a flowchart illustrating processing performed by a run-time translator.

FIG. 7 is a flowchart illustrating the processing procedure of the run-time translator 124. The flowchart illustrated in FIG. 7 corresponds to processing of translation for converting an intermediate language program into a machine language program. In a case where there is a call instruction from the intermediate language module 300 to other intermediate language module, translation into a machine language program first from the called intermediate language module 300 is performed recursively. The result is stored in the machine language module 400 indicated by the pointer 303 to the machine language data 125.

(1) The run-time translator 124 reads only one intermediate language instruction from the intermediate language data area 304 contained in the intermediate language module 300 passed as argument. A decision is made as to whether the intermediate language instruction read out is a call instruction for other module (steps 801 and 802).

(2) If the decision at the step 802 is that the intermediate language instruction read out is a call instruction for other module, the run-time translator 124 is called recursively using the calling intermediate language module as argument. Processing for translating the intermediate language program for the intermediate language module into a machine language program is started (step 804).

(3) If the result of the decision at the step 802 is that the intermediate language instruction read out is not a call instruction for other module, the run-time translator 124 converts the intermediate language instruction read out at the step 801 into a machine language instruction and writes it into the machine language module 400 (step 803).

(4) Then, the run-time translator 124 makes a decision as to whether there is any unprocessed intermediate language instruction remaining in the intermediate language module 300 contained in the intermediate language module 300 passed as argument at the step 801. If such an instruction remains, control returns to the processing of the step 801, and processing of the next intermediate language instruction is continued (step 805).

(5) If the result of the decision at the step 805 is that there is not any unprocessed intermediate language instruction, the run-time translator 124 stores the pointer indicating the machine language module 400 into the pointer 303 to the machine language data 125 (step 806).

While Embodiment 1 of the present invention has been described so far, the invention is not limited to the above embodiment. Rather, various modifications and changes thereto are possible within the range achievable from the foregoing description and within the range conducted from Embodiment 1 of the invention. For example, the above embodiment contains software. The invention can be embodied by a combination of hardware and software or only hardware. The invention can be embodied by various programming languages.

Embodiment 2

In Embodiment 2, the power-saving translation controller 129 is combined with profiled run-time translation (referred to as the "well-known run-time translation" in the description of this Embodiment 2) that restrictively permits transition to run-time translation by run-time profiling. This is described below while comparing it with the well-known run-time translation (i.e., run-time translation performed unconsciously of power-saving effects).

Figure 8:
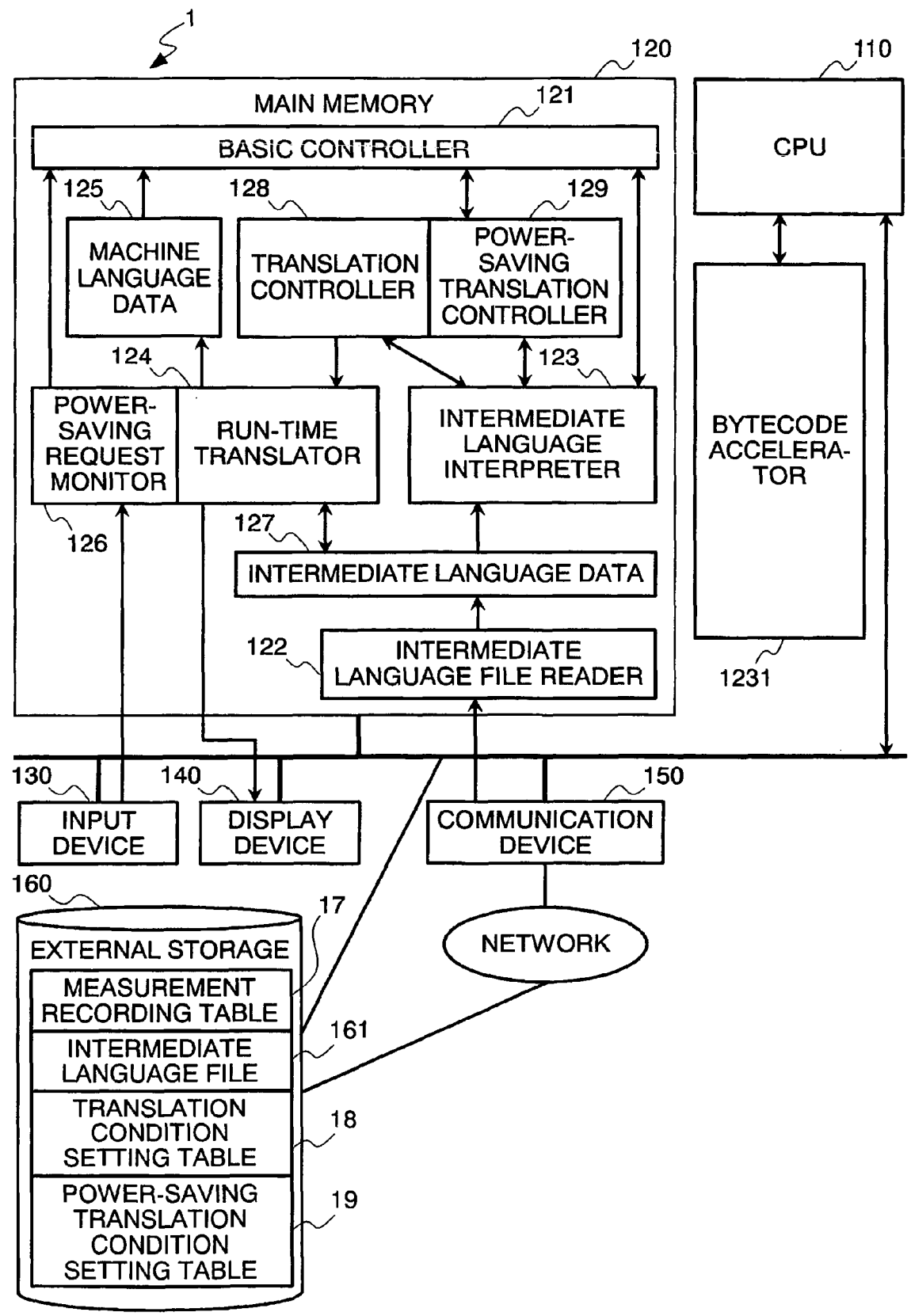
FIG. 8 is a diagram illustrating the configuration of an information processor according to another embodiment of the present invention (Embodiment 2)

The configuration of an information processor associated with an embodiment of the present invention is described with reference to the drawings. In FIG. 8 illustrating this embodiment, a run-time information measurement program 15, a measurement recording table 17, a translation condition setting table 18, a translation controller 128, and a power-saving translation condition setting table 19 are added to the components of FIG. 1. Furthermore, the power-saving translation controller 129 provides finer control than the power-saving translation controller of Embodiment 1. The other common components function in the same way as in FIG. 1.

Of these components, the run-time information measurement program 15, measurement recording table 17, translation condition setting table 18, and translation controller 128 have functions similar to the components also used in the well-known profiled run-time translation as in Patent Reference 3. On the other hand, the power-saving translation condition setting table 19 and power-saving translation controller 129 are characteristic components of the present invention.

The run-time information measurement program 15 is a program for measuring run-time information. In the following description, the number of calls (execution frequency) to processing such as a method (described later) is taken as an index about run-time information. The rate at which intermediate language species appear (execution frequency) may be used as an index about run-time information. Furthermore, other index may also be used.

The measurement recording table 17 is an area in which run-time information is recorded by the run-time information measurement program 15. The translation condition setting table 18 is an area in which conditions under which run-time translation is permitted are recorded.

The translation controller 128 makes a decision as to whether the run-time translator 124 is activated or not, based on the contents of the measurement recording table 17 and translation condition setting table 18.

The power-saving translation controller 129 makes a decision as to whether the run-time translator 124 is activated or not, based on the contents of the power-saving translation condition setting table 19, in addition to the contents of the measurement recording table 17 and translation condition setting table 18.

FIG. 9 shows the configuration of the measurement recording table 17 in Embodiment 2 of the present invention. The recording table 17 has information about measurement point number 172 and symbol name 173. The symbol name 173 corresponds to the measurement point number 172. In the example of FIG. 9, the number of calls is adopted as run-time information. In the illustrated example, the number of calls to method A is registered as measurement point number 1 and the number of calls to method B is registered as measurement point number 2.

When the method A is called, the run-time information measurement program 15 updates a pass number column 1710 regarding the number point number 1. For example, "1" is added whenever a call is made.

The configuration of the translation condition setting table 18 in Embodiment 2 of the invention is shown in FIG. 10. This table is referenced by the basic controller 12 to make a decision as to whether a run-time translation is necessary. In this table, a threshold value (decision criterion) permitting run-time translation is put in the column of a set value 181. In the example of FIG. 10, the lower limit 183 of the number at which a translation is started (i.e., the lower limit of the number of calls to the measurement point at which a run-time translation is regarded to be necessary) is set as a threshold value in the index.

FIG. 11 shows the configuration of the power-saving translation condition setting table 19 in Embodiment 2 of the invention. A threshold value (decision criterion) permitting a run-time translation is put in the column of the lower limit of the number for translation 191 when there is a power-saving request. In the case of FIG. 11, "10000" is set as the lower limit 1910 of the number of calls to the measuring point necessary to permit a run-time translation. This means that the threshold value for run-time translation is higher than the lower limit of the number 1810 (in the illustrated example, the value is "100") in the translation condition setting table 18. If the threshold value set for the case where there is a power-saving request is used, the run-time translation will be less dominant than before a power-saving request occurs. As a result, consumption of power caused by run-time translation can be suppressed. Hence, power saving can be achieved.

Figure 12:
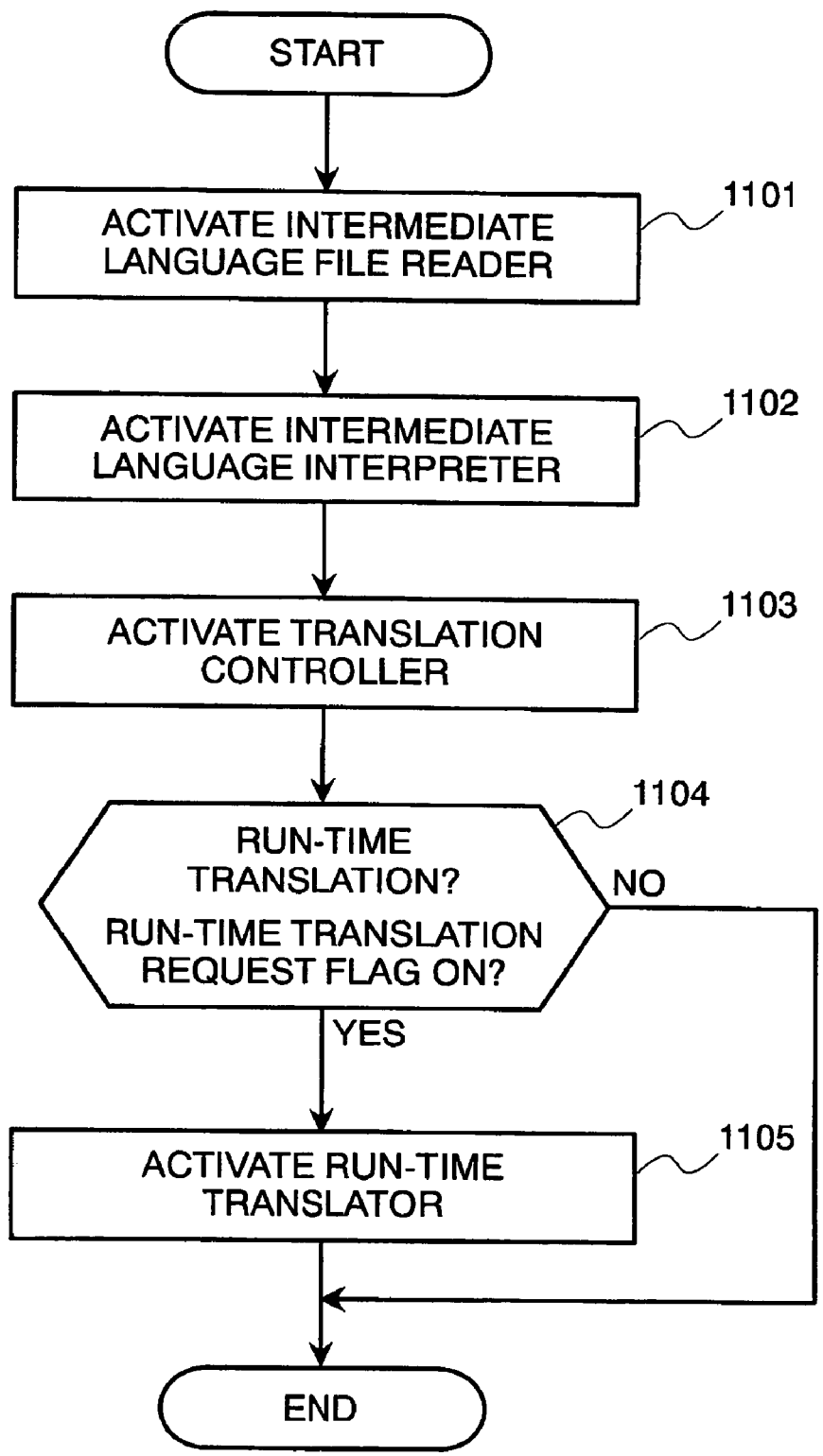
FIG. 12 is a flowchart illustrating processing performed by a basic controller in Embodiment 2, the processing being associated with well-known run-time translation.

FIG. 12 is a flowchart illustrating a processing procedure when the basic controller 121 is activated to perform the well-known run-time translation. Power-saving effects correspond to invisible processing procedure. The flowchart shown in FIG. 12 depicts processing in which the basic controller 121 activates the intermediate language interpreter 123 and run-time translator 124 after reading in the intermediate language file 161. At this time, the intermediate language interpreter 123 and run-time translator 124 may be executed concurrently or sequentially.

(1) First, the basic controller 121 activates the intermediate language file reader 122 and waits until the processing of the file reader 122 is completed (step 1101).

(2) After the completion of the processing of the intermediate language file reader 122, the basic controller 121 activates the intermediate language interpreter 123 (step 1102).

The processing of the intermediate language interpreter 123 activated at the step 1102 is described below.

Figure 13:
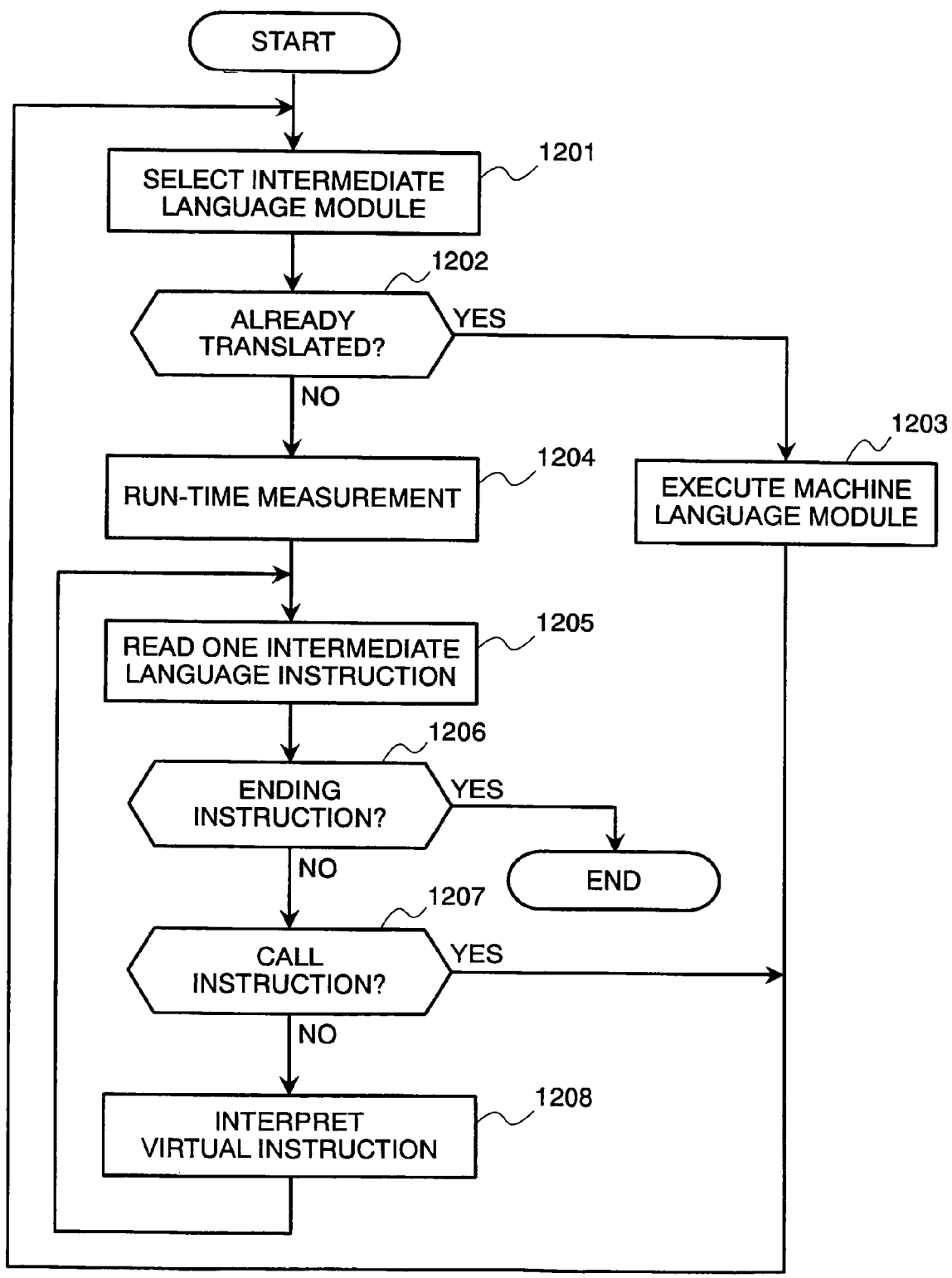
FIG. 13 is a flowchart illustrating processing performed by an intermediate language interpreter in Embodiment 2.

FIG. 13 is a flowchart illustrating the (well-known) processing procedure of the intermediate language interpreter 123 in Embodiment 2. In the processing of this flowchart, the intermediate language interpreter 123 repeats interpretation of the intermediate language data 127.

(3-1) When the intermediate language interpreter 123 is activated by the basic controller 121 because of the processing of the step 502 already described in connection with FIG. 5, the interpreter selects only one intermediate language module 300 from the intermediate language data 127. In the initial condition, an intermediate language module having a module name 301 of "MAIN" is selected (step 1201).

(3-2) The intermediate language interpreter 123 makes a decision as to whether the intermediate language module 300 selected at the step 1201 has been translated into a machine language program. If it has been translated, the interpreter causes the basic controller 121 to execute the machine language program stored in the machine language module 400 indicated by the pointer 303 to the machine language data 125 contained in the intermediate language module 300 selected at the step 1201. After the end of the execution, control returns to the processing of the step 1201 (steps 1202 and 1203).

(3-3) The intermediate language interpreter 123 then activates the run-time information measurement program 15 (step 1204). The activated run-time information measurement program 15 performs processing for given run-time information measurement that is well known in the art. As an example of the processing of this well-known given run-time information measurement, the number of calls is recorded herein. That is, the run-time information measurement program 15 updates (counts up) the column of the number of passes 171 in the run-time information recording table 17.

For example, if the intermediate code set to be interpreted is the method A, the run-time information measurement program 15 adds "1" to the recorded number (i.e., overwrites the column 1710) to leave the information meaning that the number of passes at the measuring point 1 is increased by 1. In the case of the method B, information meaning that the number of passes at the measuring point 2 is increased by 1 is recorded in the table 1711.

(3-4) The intermediate language interpreter 123 reads in one instruction of the intermediate language data area 304 contained in the intermediate language module 300 selected at the step 1201, and makes a decision as to whether the instruction is an ending instruction or not. If it is an ending instruction, the processing is ended (steps 1205 and 1206).

(3-5) If the instruction read in as a result of the decision made at the step 1206 is not an ending instruction, the intermediate language interpreter 123 makes a decision as to whether the instruction read in at the step 1205 is a call instruction or not. If it is a calling instruction, the processing is ended. If not so, the instruction read in at the step 1205 is directly executed. In a case where the bytecode accelerator 1231 is installed, this accelerator is used in combination. After the execution, control returns to the processing of the step 705. Processing of the next instruction is continued (steps 1207 and 1208).

The processing of the intermediate language interpreter 123 has been described so far. Description is returned to steps 1103 et seq. of the flowchart of FIG. 12.

Figure 14:
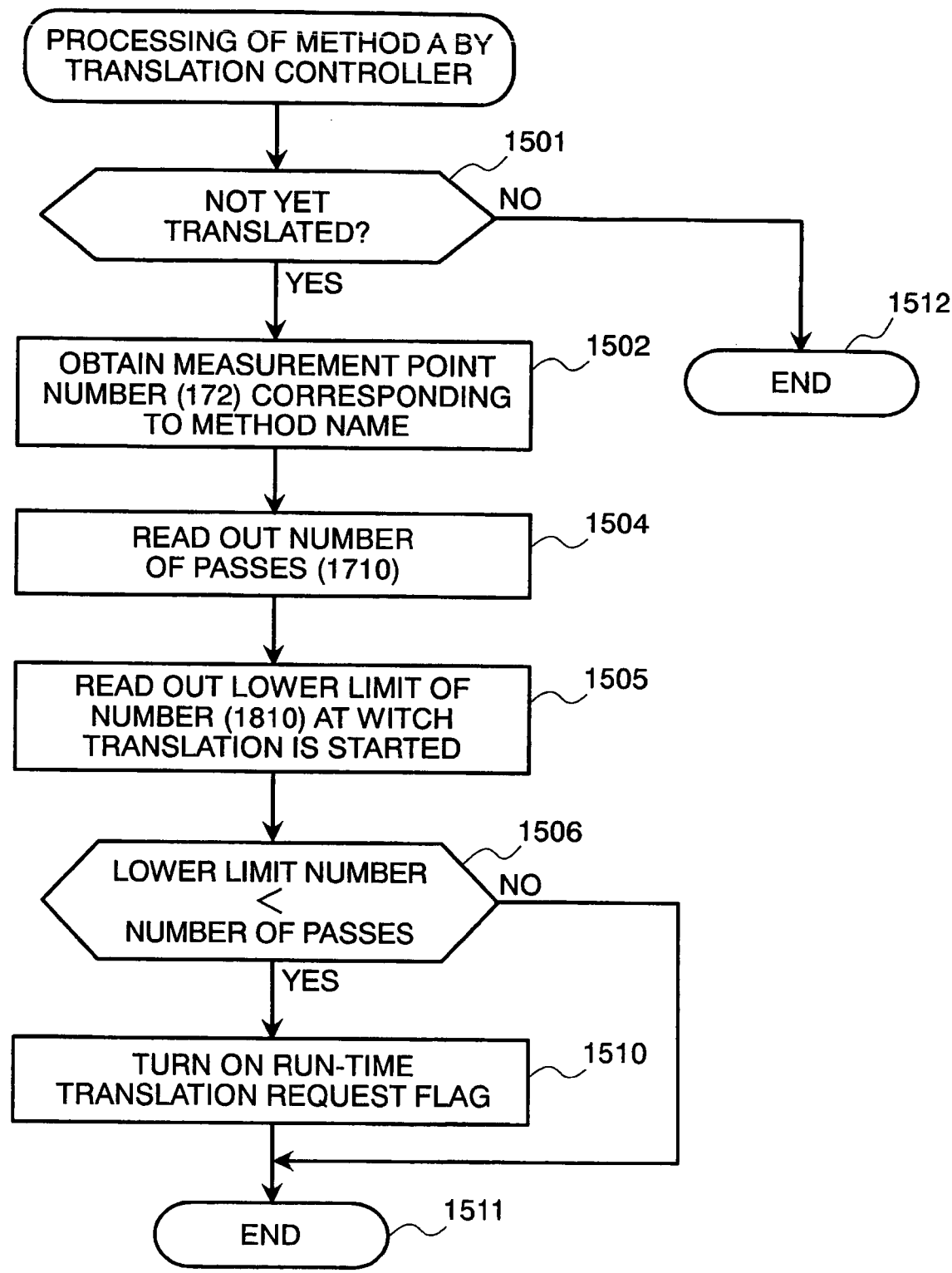
FIG. 14 is a flowchart illustrating processing performed by a translation controller in Embodiment 2, the processing being associated with well-known run-time translation.

(4) The basic controller 121 activates the translation controller 128 (step 1103). The flow of the processing of the translation controller 128 is illustrated in FIG. 14. In this example, the method A is treated. First, the translation controller 128 checks if the measuring point (method A) has been translated (step 1501). If it has been translated, the processing is immediately ended (step 1512). If the point has not been translated, the translation controller 128 refers to the run-time information and performs the run-time translation conditionally.

On the other hand, if the decision at the step 1501 is that the measuring point (method A) has not been translated, the translation controller 128 refers to the contents of the measurement recording table 17 and translation condition setting table 18 to judge the conditions (steps 1502, 1504, 1505, and 1506). That is, the operation of the translation controller 128 assumes the following two modes depending on the contents of the measurement recording table 17 and translation condition setting table 18.

(a) When the number of passes has reached the lower limit of the number 1810 at which a translation is started (i.e., lower limit of the number at which a translation is started≦number of passes), the run-time translation request flag not shown in FIG. 8 is turned ON (i.e., the run-time translation is performed) (steps 1510 and 1511).

(b) When the number of passes has not reached the lower limit of the number at which a translation is started (i.e., lower limit of the number at which a translation is started>number of passes), the run-time translation request flag is turned OFF (no run-time translation is performed) (step 511).

The processing of the translation controller 128 has been described so far. The description is returned to the steps 1104 et seq. of the flowchart of FIG. 12.

(5) Where the run-time translation request flag is ON, the basic controller 121 activates the run-time translator 124 (steps 1104 and 1105). Where the flag is OFF, the processing is immediately ended. In this way, a branch occurs between the case where the run-time translation is performed and the case where it is not performed.

The processing procedure of the run-time translator 124 is the same as the procedure of FIG. 7 shown in Embodiment 1.

The procedure of the well-known run-time translation ends in this way. During this well-known run-time translation, none of the power-saving translation condition setting table 19 and power-saving translation controller 129 participate. On the other hand, in Embodiment 2 of the present invention now to be described, participation of the power-saving translation condition setting table 19 and power-saving translation controller 129 is distinctive compared with the well-known run-time translation. Where the power-saving request monitor 126 has detected transition to the power-saving mode, the power-saving translation controller 129 provides such a control that the likelihood of occurrence of run-time translation is made different than in the immediately executed environment. This is a feature of the present invention.

Figure 15:
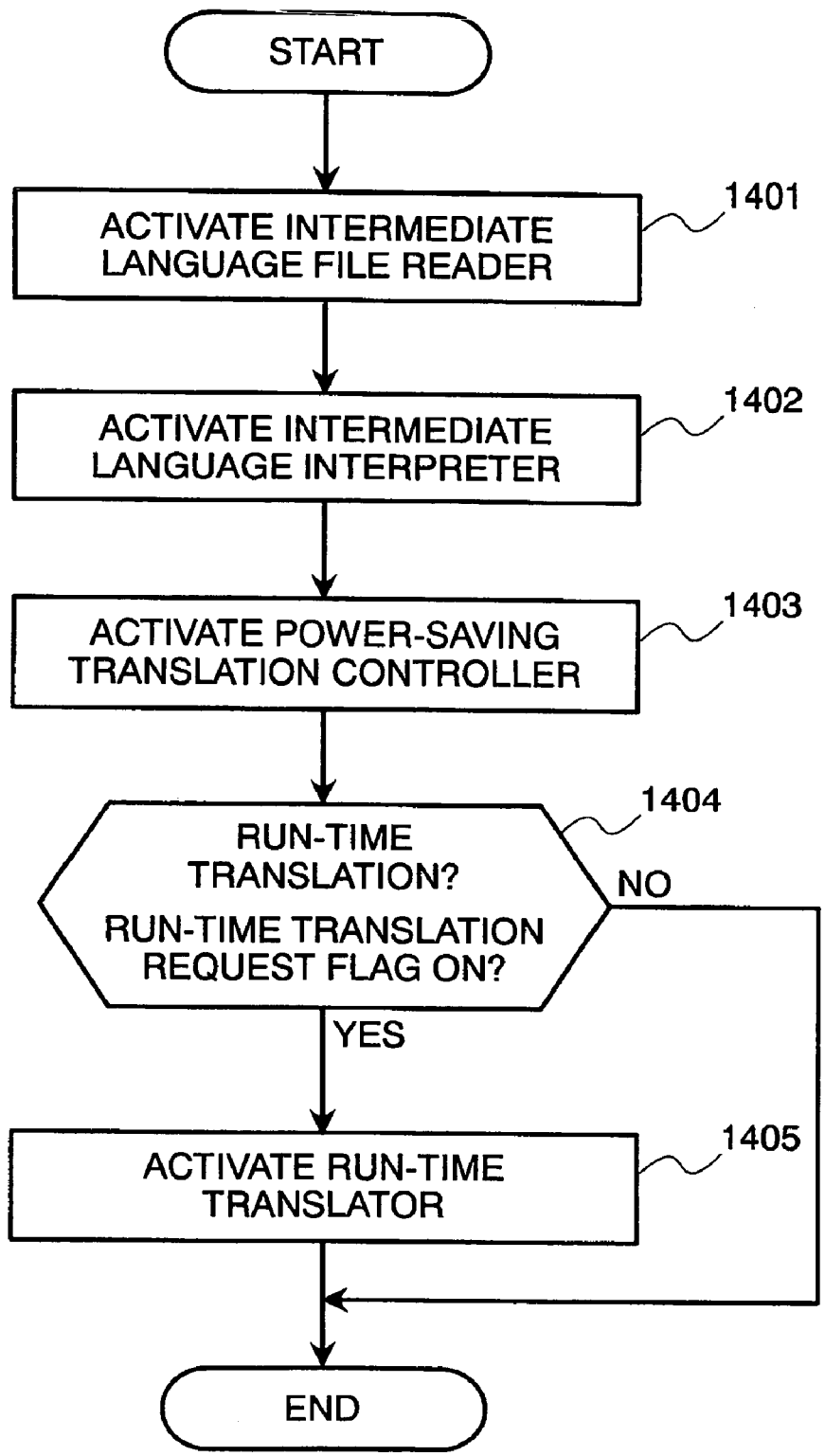
FIG. 15 is a flowchart illustrating processing performed by a basic controller in Embodiment 2 of the present invention.

The processing procedure characterizing Embodiment 2 of the present invention is described below by referring to the drawings. Note that the invention is not restricted by this. FIG. 15 is a flowchart illustrating the processing procedure performed until a run-time translation is performed, in view of the power-saving effects which are characteristic of the present invention. In the flowchart of FIG. 15, the basic controller 121 activates the intermediate language interpreter 123 and run-time translator 124 after reading in the intermediate language file 161. At this time, the intermediate language interpreter 123 and run-time translator 124 may be executed concurrently or serially.

(1) First, the basic controller 121 activates the intermediate language file reader 122 and waits until the processing of the intermediate language file reader 122 is completed (step 1401).

(2) After the completion of the processing of the intermediate language file reader 122, the basic controller 121 activates the intermediate language interpreter 123 (step 1402).

(3) The intermediate language interpreter 123 performs processing similar to the processing of the flowchart of FIG. 12 already described. The sequence of processing is identical with the flow of the well-known processing up to this point.

(4) The basic controller 121 then activates the power-saving translation controller 129 instead of the translation controller 128 unlike the well-known run-time translation (step 1403). This is a step intrinsic to the run-time translation that is characteristic of the present invention.

Figure 16:
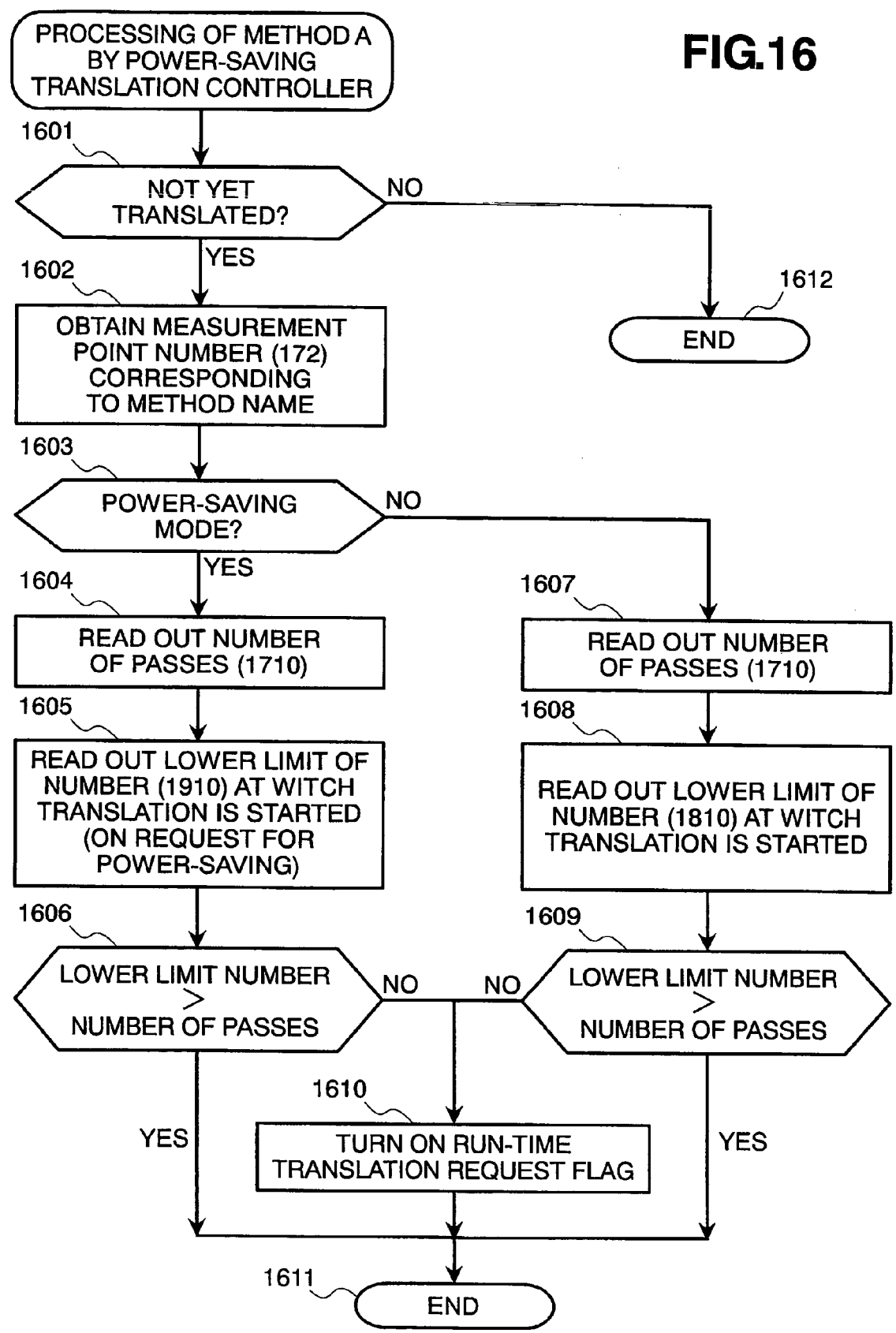
FIG. 16 is a flowchart illustrating processing performed by a power-saving translation controller in Embodiment 2 of the invention.

The flow of processing of the power-saving translation controller 129 is illustrated in FIG. 16. In the illustrated example, method A is treated. First, a check is made as to whether the measuring point (method A) has been translated (step 1601). If so, the processing is immediately ended (step 1612). If not so, the power-saving translation controller 129 refers to the power-saving flag (step 1603).

Where the power-saving flag is OFF, the power-saving translation controller 129 refers to the contents of the measurement recording table 17 and translation condition setting table 18 in the same way as in the well-known run-time translation (steps 1602, 1607, 1608, and 1609). That is, the operation branches to the following two modes depending on the contents of the measurement recording table 17 and translation condition setting table 18.

(a) When the number of passes has reached the lower limit of the number at which a translation is started (i.e., lower limit of the number at which a translation is started≦number of passes), the run-time translation request flag is turned ON (i.e., the run-time translation is performed) (steps 1610 and 1611).

(b) When the number of passes has not reached the lower limit of the number at which a translation is started (i.e., lower limit of the number at which a translation is performed>number of passes), the run-time translation request flag is turned OFF (i.e., no run-time translation is performed) (step 1611).

On the other hand, when the power-saving flag is ON, the power-saving translation controller 129 refers to the contents of the measurement recording table 17. The controller also refers to the contents of the power-saving translation condition setting table 19 unlike in the well-known run-time translation (steps 1602, 1604, 1605, and 1606). That is, the operation branches to the following two modes depending on the contents of the measurement recording table 17 and the power-saving translation condition setting table 19.

(a) When the number of passes has reached the lower limit of the number 1910 at which a translation is started (when there is a power-saving request) (i.e., the lower limit of the number at which a translation is started (when there is a power-saving request)≦number of passes), the run-time translation request flag is turned ON (i.e., a run-time translation is performed) (steps 1610 and 1611).

(b) When the number of passes has not reached the lower limit of the number 1910 at which a translation is started (when there is a power-saving request) (i.e., the lower limit of the number at which a translation is started (when there is a power-saving request)>number of passes), the run-time translation request flag is turned OFF, i.e., no run-time translation is performed (step 1611).

The processing of the power-saving translation controller 129 has been described so far. The description is returned to steps 1404 et seq. of the flowchart of FIG. 15.

(5) When the run-time translation request flag is ON, the basic controller 121 activates the run-time translator 124 (steps 1404 and 1405). When the flag is OFF, the processing is immediately ended. In this way, a branch occurs between the case where a run-time translation is performed and the case where no run-time translation is performed.

The processing procedure of the run-time translator 124 is the same as the procedure of FIG. 8 shown in Embodiment 1. Embodiment 2 of the present invention has been described so far. Notice that the present invention is not limited to the above embodiment. It can be modified variously within the range attainable from the above description or within the range conducted from Embodiment 2 of the invention. For example, the above embodiment contains software. The present invention can be embodied by a combination of hardware and software or only by hardware. The invention can be embodied by various programming languages.

As one example of the control means provided by the power-saving translation controller 129, each set value in the translation condition setting table 18 may be updated without using the power-saving translation condition setting table 19. That is, if one wants to make the run-time translation less dominant than prior to power-saving request, by increasing the level of the threshold of the run-time translation, each set value 181 in the translation condition setting table 18 may be modified to a greater value.

In both Embodiments 1 and 2, the operation is made to branch according to two values indicating whether power-saving mode has been specified or not. Continuous variations in the value of the remaining capacity of the battery may be gained, and the operation may be controlled finely in a corresponding manner to the variations in the numerical value. That is, the threshold value may be varied continuously.

The measurement recording table 17 may be stored in the management data 305 corresponding to the intermediate language module 300 and executed.

Where the run-time translation is suppressed and priority is given to execution using an intermediate language, the ratio at which bytecodes supported by the bytecode accelerator for the intermediate language (bytecodes) appear may be quite low in some cases.

In such a case, most of the execution of the intermediate language is assigned to the intermediate language interpreter in software and so the execution speed deteriorates severely. In addition, the power consumption is increased by an amount corresponding to an increase in the CPU load (dynamic step). That is, the power-saving may be deleteriously affected though the run-time translation is suppressed. To mitigate the deleterious effect on the power-saving, conditions that mitigate the conditions under which transition to run-time translation is made may be used in combination in addition to suppression of run-time translation. In any case, power-saving effect is commonly utilized in setting the conditions under which transition to a run-time translation is made. It may be practiced within the scope of the present invention.

Additionally, a structure not having the bytecode accelerator 1231 may also be adopted, because this structure may be achieved within the scope of the present invention in an information processor where the frequency of run-time translation creates a tradeoff between the power consumption and other item of performance such as the execution speed.

Further, in the above embodiment, various components stored in the external storage 160 such as a hard disk are shown to be transferred to the main memory 121 and referenced or executed. These various means may be stored in a storage medium such as an external storage medium (such as a CD-ROM or floppy disk) or a semiconductor memory (such as flash EEPROM), read from the storage medium, and used. Data transmitted from the outside by data communication may be stored in some form of storage medium.

Moreover, in the description of the present embodiment, it has been assumed that the processing of the interpreter in the hardware accelerator is smaller in power consumption than the processing of the run-time translation means to perform a run-time translation. If there is a circumstance where the processing of the interpreter is greater in power consumption than the processing of the run-time translation, a decision may be made as to whether the processing of the interpreter is executed instead of the decision as to whether a run-time translation is executed as in the description of the seventh through twelfth aspects, and then an instruction for execution may be given.

According to the present invention, the allotment ratio between run-time translation and intermediate language interpretation can be modified according to circumstances. This makes it possible to suppress the power consumption of the information processor while maintaining a high level of execution speed. Especially, in an information processor that converts an intermediate language into a CPU's native instruction set by a hardware accelerator, in a case where run-time translation (JIT compiler) is used in combination in order to increase the speed further, if power saving is required, the execution frequency of the method capable of easily suppressing power consumption (generally, intermediate language interpretation involving a bytecode accelerator) is increased and conversely if emphasis is placed on high speed rather than power saving, the execution frequency of the run-time translation is increased. In this way, tradeoff between the power consumption and execution speed can be easily optimized.

Accordingly, the allocation ratio between run-time translation and intermediate language interpretation is made variable. Power consumption can be suppressed while maintaining an appropriate execution speed.

Having described preferred embodiments of the invention with reference to the accompanying drawings, it is to be understood that the invention is not limited to the embodiments and that various changes and modifications could be effected therein by one skilled in the art without departing from the spirit or scope of the invention as defined in the appended claims.

The invention claimed is:

1. An information processor carried out by a computer and having interpretation means for interpreting a source program or an intermediate language program and run-time translation means for translating the program into a machine language program native to the computer, said information processor comprising:

a power-saving request monitor for monitoring whether or not there is a power-saving request from an input interface or a predetermined power-saving request in a given memory device, the power-saving request making a request for suppression of power consumed by the information processor; and a power-saving translation controller for making a decision as to whether said run-time translation means executes run-time translation of said program according to whether there is the power-saving request and instructing the run-time translation means to execute processing of run-time translation based on the result of the decision; and wherein said power-saving translation controller makes a decision as to whether said run-time translation means executes the run-time translation of said program according to magnitude of said power-saving request, and instructs the run-time translation means to execute processing of run-time translation based on the result of the decision.

2. An information processor as set forth in claim 1, wherein if the result of the decision is that there is the power-saving request, said power-saving translation controller disables execution of run-time translation of said program and if the result of the decision is that there is not the power-saving request, said power-saving translation controller enables the execution of the run-time translation of the program.

3. An information processor as set forth in claim 1, wherein when making said decision, said power-saving translation controller disables execution of the run-time translation of said program in a case where said power-saving request makes a request for power saving stronger than a given decision criterion and enables execution of the run-time translation of said program in a case where said power-saving request makes a request for power saving weaker than the given decision criterion.

4. An information processor as set forth in claim 1, wherein said power-saving translation controller varies a decision criterion for whether the run-time translation is executed or not, depending on whether there is said power-saving request or on circumstances of power consumed by the information processor.

5. An information processor as set forth in claim 4, wherein said decision criterion is a predetermined execution frequency determined regarding the execution frequency of said program, and wherein when said decision criterion is varied and there is said power-saving request or the circumstances of the power consumed require power saving, said power-saving translation controller sets the given execution frequency that is said decision criterion to a frequency higher than in a case where there is not said power-saving request or the circumstances of power consumed do not require power saving.

6. An information processor carried out by at least one central processor unit (CPU) and having interpretation means for interpreting a source program or intermediate language program, a hardware accelerator interlocking with said interpretation means and translating an instruction expression contained in said program into instructions native to a CPU of the information processor, and run-time translation means for translating the program into a machine language program native to a computer, said information processor comprising:
 a power-saving request monitor for monitoring whether or not there is a power-saving request from an input interface or a predetermined power-saving request in a given memory device, the power-saving request making a request for suppression of power consumed by the information processor; and
 a power-saving translation controller for making a decision as to whether said run-time translation means executes run-time translation of said program or as to whether processing of an interpreter involving said hardware accelerator is executed or not according to whether there is the power-saving request, and instructing the run-time translation means to execute the run-time translation or instructing the hardware accelerator to execute the processing of the interpreter according to the result of the decision; and
 wherein said power-saving translation controller makes the decision as to whether said run-time translation means executes run-time translation of said program or as to whether processing of the interpreter involving said hardware accelerator is executed according to magnitude of the power-saving request and instructs the run-time translation means to execute the run-time translation or instructs the hardware accelerator to execute the processing of the interpreter based on the result of the decision; and
 wherein when said decision is made, in a case where said power-saving request makes a request for rower saving stronger than a given decision criterion, said power-saving translation controller disables execution of the run-time translation of the program or processing of the interpreter and, in a case where the power-saving request makes a request for power saving weaker than the given decision criterion, said power-saving translation controller enables execution of the run-time translation of the program or processing of the interpreter.

7. An information processor as set forth in claim 6, wherein when making said decision, said power-saving translation controller disables execution of the run-time translation of said program or processing of the interpreter in a case where there is said power-saving request and enables execution of run-time translation of the program or processing of the interpreter in a case where there is not said power-saving request.

8. An information processor as set forth in claim 6, wherein said power-saving translation controller modifies a decision criterion for whether the run-time translation or processing of the interpreter is executed or not, depending on whether there is the power-saving request or on circumstances of power consumed by the information processor.

9. An information processor as set forth in claim 8, wherein said decision criterion is a given execution frequency determined regarding the execution frequency of said program, and wherein when said decision criterion is modified and there is said power-saving request or circumstances of the power consumed require power saving, said power-saving translation controller sets the given execution frequency that is said decision criterion to a frequency higher than in a case where there is not the power-saving request or the circumstances of power consumed do not require power saving.

10. An information processing method for an information processor having interpretation means for interpreting a source program or intermediate language program and run-time translation means for translating the program into a machine language program native to a computer, where said method is carried out by the computer and comprising the steps of:
 monitoring whether or not there is a power-saving request from an input interface or a predetermined power-saving request in a given memory device, the power-saving request making a request for suppression of power consumed by the information processor;
 making a decision as to whether said run-time translation means executes run-time translation of said program according to whether there is the power-saving request; and
 instructing said run-time translation means to execute processing of the run-time translation based on the result of the decision; and
 wherein said making the decision as to whether said run-time translation means executes the run-time translation of said program according to magnitude of said power-saving request, and instructs the run-time translation means to execute processing of run-time translation based on the result of the decision.

11. An information processing method for an information processor having interpretation means for interpreting a source program or intermediate language program, a hardware accelerator interlocking with the interpretation means and converting an instruction expression contained in the program into instructions native to a CPU of the information processor, and run-time translation means for translating the program into a machine language program native to a computer, where said method is carried out by the computer and comprising the steps of:
 monitoring whether or not there is a power-saving request from an input interface or a predetermined power-saving request in a given memory device, the power-saving request making a request for suppression of power consumed by the information processor;
 making a decision as to whether said run-time translation means executes run-time translation of said program or processing of an interpreter involving the hardware accelerator is executed according to whether there is the power-saving request; and
 instructing said run-time translation means to execute processing of run-time translation or instructing the hardware accelerator to execute processing of the interpreter based on the result of the decision
 wherein said making the decision as to whether said run-time translation means executes run-time translation of said program or as to whether processing of the interpreter involving said hardware accelerator is executed according to magnitude of the power-saving request and instructs the run-time translation means to execute the run-time translation or instructs the hardware accelerator to execute the processing of the interpreter based on the result of the decision; and
 wherein when said decision is made, in a case where said power-saving request makes a request for power saving stronger than a given decision criterion, said power-saving translation controller disables execution of the run-time translation of the program or processing of the interpreter and, in a case where the power-saving request makes a request for power saving weaker than the given decision criterion, said power-saving translation controller enables execution of the run-time translation of the program or processing of the interpreter.

12. A computer storage medium embodying a program for implementing an information processing method for an information processor having interpretation means for interpreting a source program or intermediate language program and run-time translation means for translating the program into a machine language program native to a computer, said method comprising the steps of:
   monitoring whether or not there is a power-saving request from an input interface or a predetermined power-saving request in a given memory device, the power-saving request making a request for suppression of power consumed by the information processor; and
   making a decision as to whether said run-time translation means executes run-time translation of said program according to whether there is the power-saving request and instructing said run-time translation means to execute processing of run-time translation based on the result of the decision; and
   wherein said making the decision as to whether said run-time translation means executes the run-time translation of said program according to magnitude of said power-saving request, and instructs the run-time translation means to execute processing of run-time translation based on the result of the decision.

13. A computer storage medium embodying a program for implementing an information processing method for an information processor having interpretation means for interpreting a source program or intermediate language program, a hardware accelerator interlocking with the interpretation means and converting an instruction expression contained in the program into instructions native to a CPU of the information processor, and run-time translation means for translating the program into a machine language program native to a computer, said method comprising the steps of:
   monitoring whether or not there is a power-saving request from an input interface or a predetermined power-saving request in a given memory device, the power-saving request making a request for suppression of power consumed by the information processor;
   making a decision as to whether said run-time translation means executes run-time translation of said program or processing of an interpreter involving said hardware accelerator is executed according to whether there is the power-saving request; and
   instructing said run-time translation means to execute processing of run-time translation or instructing the hardware accelerator to execute processing of the interpreter based on the result of the decision
   wherein said making the decision as to whether said run-time translation means executes run-time translation of said program or as to whether processing of the interpreter involving said hardware accelerator is executed according to magnitude of the power-saving request and instructs the run-time translation means to execute the run-time translation or instructs the hardware accelerator to execute the processing of the interpreter based on the result of the decision; and
   wherein when said decision is made, in a case where said power-saving request makes a request for power saving stronger than a given decision criterion, said power-saving translation controller disables execution of the run-time translation of the program or processing of the interpreter and, in a case where the power-saving request makes a request for rower saving weaker than the given decision criterion, said power-saving translation controller enables execution of the run-time translation of the program or processing of the interpreter.

\* \* \* \* \*